(12) United States Patent
Ooi et al.

(10) Patent No.: US 7,764,354 B2
(45) Date of Patent: Jul. 27, 2010

(54) MULTI-LAYER DIFFRACTION TYPE POLARIZER AND LIQUID CRYSTAL ELEMENT

(75) Inventors: Yoshiharu Ooi, Koriyama (JP); Masahiro Murakawa, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 1021 days.

(21) Appl. No.: 11/313,694

(22) Filed: Dec. 22, 2005

(65) Prior Publication Data

US 2006/0103778 A1 May 18, 2006

Related U.S. Application Data

(60) Division of application No. 10/784,714, filed on Feb. 24, 2004, now Pat. No. 7,079,202, which is a continuation of application No. PCT/JP02/08517, filed on Aug. 23, 2002.

(30) Foreign Application Priority Data

| Aug. 24, 2001 | (JP) | ............................. 2001-254700 |
| Aug. 27, 2001 | (JP) | ............................. 2001-256301 |
| Sep. 27, 2001 | (JP) | ............................. 2001-296605 |

(51) Int. Cl.
*G02F 1/13* (2006.01)
(52) U.S. Cl. ...................................... 349/194; 349/201
(58) Field of Classification Search ................. 349/194, 349/201
See application file for complete search history.

(56) References Cited

U.S. PATENT DOCUMENTS

| 4,505,546 A | 3/1985 | Umeda et al. |
| 5,245,471 A | 9/1993 | Iwatsuka et al. |
| 5,473,465 A | 12/1995 | Ye |
| 5,619,356 A | 4/1997 | Kozo et al. |

(Continued)

FOREIGN PATENT DOCUMENTS

EP 0 390 610 A2 10/1990

(Continued)

OTHER PUBLICATIONS

U.S. Appl. No. 11/627,720, filed Jan. 26, 2007, Sato.

(Continued)

*Primary Examiner*—David Nelms
*Assistant Examiner*—David Y Chung
(74) *Attorney, Agent, or Firm*—Oblon, Spivak, McClelland, Maier & Neustadt, L.L.P.

(57) ABSTRACT

A multi-layer diffraction type polarizer is formed by laminating at least two polarizing diffraction gratings each having a birefringent material which straightly transmits incident light having a first polarization direction without functioning as a diffraction grating, and diffracts incident light having a second polarization direction perpendicular to the first polarization direction by functioning as a diffraction grating. Further, in order to realize an optical attenuator having a high extinction ratio even at low voltage, a phase plate made of an organic thin film is provided to cancel the retardation of the liquid crystal cell remaining when the voltage is applied. Further, in order to rotate the polarization direction of a linearly polarized incident light, the liquid crystal cell is provided with a $\lambda/4$ phase plate comprising an organic thin film.

7 Claims, 10 Drawing Sheets

U.S. PATENT DOCUMENTS

| | | |
|---|---|---|
| 5,739,952 A | 4/1998 | Takeda et al. |
| 5,914,811 A | 6/1999 | Chen et al. |
| 6,271,905 B1 | 8/2001 | Sekime et al. |
| 6,362,862 B1 | 3/2002 | Itoh et al. |
| 6,580,674 B1 * | 6/2003 | Nishiyama et al. ..... 369/112.01 |
| 6,922,220 B2 | 7/2005 | Okamoto et al. |

FOREIGN PATENT DOCUMENTS

| | | |
|---|---|---|
| EP | 0 463 723 A2 | 1/1992 |
| EP | 0 539 847 A1 | 5/1993 |
| EP | 0 663 604 A1 | 7/1995 |
| GB | 2326245 A | 12/1998 |
| JP | 62-289804 | 12/1987 |
| JP | 2-4212 | 1/1990 |
| JP | 2-165023 | 6/1990 |
| JP | 3-6519 | 1/1991 |
| JP | 3-31803 | 2/1991 |
| JP | 3-188419 | 8/1991 |
| JP | 4-40427 | 2/1992 |
| JP | 5-158099 | 6/1993 |
| JP | 6-27320 | 2/1994 |
| JP | 7-152025 | 6/1995 |
| JP | 10-68816 | 3/1998 |
| JP | 11-84320 | 3/1999 |
| JP | 11/352326 | 12/1999 |
| JP | 2000-131684 | 5/2000 |
| JP | 2000-249831 | 9/2000 |
| JP | 2000-347028 | 12/2000 |
| JP | 2001-91741 | 4/2001 |

OTHER PUBLICATIONS

International Search Report and Translation, May 24, 2004.

Derwent Publications, Database WPI, AN 1999-291791, XP-002335464, JP 11/095027, Apr. 9, 1999.

* cited by examiner

P-POLARIZED LIGHT

MULTI-LAYER DIFFRACTION TYPE POLARIZER AND LIQUID CRYSTAL ELEMENT

CROSS-REFERENCE TO RELATED APPLICATIONS

This application is a divisional of U.S. patent application Ser. No. 10/784,714, filed Feb. 24, 2004, which is a continuation of International Patent Application No. PCT/JP02/08517, filed Aug. 23, 2002, and claims priority from the following Japanese Patent Applications: No. 2001-254700, filed Aug. 24, 2001, No. 2001-256301, filed Aug. 27, 2001, and No. 2001-296605, filed Sep. 27, 2001. The entire contents of these applications are incorporated herein by reference in their entireties.

TECHNICAL FIELD

The present invention relates to a multi-layer diffraction type polarizer and a liquid crystal element, in particular, a multi-layer diffraction type polarizer used as an isolator for optical communications and a liquid crystal element used for an optical attenuator or for a polarization rotator.

BACKGROUND ART

In an information reading optical head device for an optical disk such as a CD or a DVD, for example, a polarizing diffraction grating 500 shown in FIG. 15 is used as a polarizing beam splitter. The polarizing diffraction grating comprises a diffraction grating 1 made of a birefringent material layer having an ordinary refractive index $n_o$ and an extraordinary refractive index $n_e$ ($n_o \neq n_e$) formed on one side of a glass substrate which is a transparent substrate 4, and the diffraction grating 1 has a periodical structure of concavo-convex shape with a step height d in cross section.

The concavo-convex portion of the periodical structure is filled with a homogeneous refractive index transparent material 3 having a refractive index $n_s$ substantially equal to the ordinary refractive index $n_o$ so that the concavo-convex portion is leveled, and a glass substrate as a transparent substrate 5 is overlaid on the homogeneous refractive index transparent material 3 to form the polarizing diffraction grating 500. Here, $|n_e - n_s| \times d$ is made to be a half of the wavelength $\lambda$ of incident light, whereby a polarizing diffraction grating is obtained, in which an ordinary polarized incident light (polarized in the direction providing ordinary refractive index) is straightly transmitted without being diffracted, and an extraordinary polarized incident light (polarized in the direction providing extraordinary refractive index) is diffracted and is not straightly transmitted.

There has been a problem that a sufficient extinction ratio can not be obtained when such a polarizing diffraction grating is used as an isolator for optical communication using a wavelength band of 1400 to 1700 nm. Namely, provided that the intensity of a first linearly polarized light (for example, ordinary polarized light) straightly transmitted is $I_1$ and the intensity of a second linearly polarized light (extraordinary polarized light) straightly transmitted and polarized in a direction perpendicular to the polarization direction of the first linearly polarized light is $I_2$, a ratio $I_2/I_1$ (hereinafter referred to as extinction ratio) of light of given single wavelength $\lambda_0$ becomes at most −20 dB. However, since the transmittance of the straightly transmitted light of extraordinary polarized light is expressed by $\cos^2(0.5 \times \pi \times \lambda_0/\lambda)$, component of the incident light straightly transmitted without being diffracted is increased and the extinction ratio is deteriorated as the wavelength $\lambda$ is away from $\lambda_0$.

Further, in order to achieve a higher extinction ratio for a given single wavelength, it is necessary to accurately form the step height d of the periodical structure having a concavo-convex shape, and it has been difficult to obtain a polarizing diffraction grating having a high extinction ratio with good reproducibility.

Further, an example of a conventional optical attenuator employing liquid crystal is shown in FIG. 16. The optical attenuator is constituted by a liquid crystal cell 210 comprising transparent substrates 15 and 16 on which transparent electrodes 13 and 14 are formed, and a liquid crystal layer 11 of nematic liquid crystal in which the alignment direction of liquid crystal molecules is in parallel with the substrate surfaces and at an angle of 45° to the X-axis, sandwiched between the transparent substrates 15 and 16 and sealed inside a sealing member 18 provided at the peripheries of the substrates; and a polarizer 9 disposed at the light output side of the liquid crystal cell, which transmits only linearly polarized light polarized in X-axis direction.

Here, an AC power source 19 is connected to the transparent electrodes 13 and 14 to supply rectangular waves, and the thickness of the liquid crystal layer 11 is determined so that the retardation value of the liquid crystal cell 210 becomes about $\lambda/2$ for a linearly polarized light having a wavelength $\lambda$ and polarized in the direction of Y-axis, when the voltage is not applied by the power source. Here, the purpose of setting the retardation value of the liquid crystal layer 11 to be about $\lambda/2$, is to minimize the insertion loss of the optical attenuator when the voltage is not applied, and to make the optical attenuator function as a $\lambda/2$ plate.

In this optical attenuator, the linearly polarized light polarized in the direction of Y-axis transmitted through the liquid crystal layer when the voltage is not applied between the transparent electrodes, becomes a linearly polarized light polarized in the direction of X-axis and is transmitted through the polarizer. When the voltage is applied, the alignment direction of liquid crystal molecules are tilted in the direction of the thickness of the liquid crystal layer, namely tilted perpendicularly to the substrates, as the applied voltage is increased. Accordingly, the retardation value of the liquid crystal cell is decreased and the light transmitted through the liquid crystal cell 210 becomes an elliptically polarized light. As a result, since the intensity of the transmitted light through the polarizer is simply decreased by the increase of the applied voltage, the optical attenuator is of a voltage variable type.

In a case of an optical attenuator employing a liquid crystal element, for optical communications using incident light having a wavelength of, for example, 1300 to 1600 nm, it is necessary to make the liquid crystal layer thicker than that of an optical attenuator for a visible wavelength region in order to make the retardation value of the liquid crystal cell to be $\lambda/2$. As a result, there has been a problem that a polarized light component transmitted through the polarizer remains, and therefore, an optical attenuator having a high extinction ratio can not be obtained, since even if an AC voltage having a voltage amplitude of at least 10 V is applied, the alignment direction of the liquid crystal molecules is not sufficiently oriented in the direction of the thickness of the liquid crystal layer and the retardation value of the liquid crystal cell does not become zero.

Further, FIG. 17 shows an example of conventional liquid crystal element for rotating the polarization direction of incident light as a linearly polarized light in accordance with the magnitude of an applied voltage.

The liquid crystal element is constituted by a liquid crystal cell 210 comprising transparent substrates 15 and 16 on which transparent electrodes 13 and 14 are formed, a liquid crystal layer 11 of nematic liquid crystal in which the alignment direction of liquid crystal molecules is in parallel with the substrate surfaces and in the direction at 45° to X-axis, the liquid crystal layer being sandwiched between the substrates and sealed by a sealing member 18; and a phase plate 10 made of a birefringent crystal having a fast axis or a slow axis in the direction of X-axis disposed at the light output side of the liquid crystal cell 210. Here, an AC power source 19 for generating rectangular waves is connected to the transparent electrodes 13 and 14, the thickness of the liquid crystal layer 11 is determined so that the retardation value R of the liquid crystal cell 210 for the linearly polarized incident light having a wavelength $\lambda$ and polarized in the direction of X-axis when the voltage is not applied, is substantially $\lambda/2$, and the retardation value of the phase plate 10 is $\lambda/4$.

In this liquid crystal element, when the voltage is not applied between the transparent electrodes 13 and 14, the light transmitted through the liquid crystal layer becomes a linearly polarized light polarized in the direction of Y-axis, and is transmitted through the phase plate maintaining the state of linear polarization in the direction of Y-axis since the polarization direction coincides with either the slow axis or the fast axis of the phase plate 10. As the applied voltage is increased, the alignment direction of the liquid crystal molecules is tilted in the direction of the thickness of the liquid crystal layer. Accordingly, the retardation value R of the liquid crystal layer is decreased and the light transmitted through the liquid crystal cell 210 becomes an elliptically polarized light. Here, the polarization direction is rotated in accordance with the retardation value R of the liquid crystal layer maintaining the state of linear polarization when the light is transmitted through the phase plate 10.

The phase plate 10 to be employed for such a liquid crystal element is generally a birefringent crystal such as a quartz processed to have a thickness of at least 0.3 mm. However, in the case of a birefringent crystal, there has been a problem that the retardation value depends strongly on the incident angle as an angle between the propagation direction of the incident light and the normal line of the phase plate, which causes variation of the retardation value in the device plane for converging rays or diverging rays, and accordingly, polarization of the output light is not consistent. Further, since the retardation value has a dependency on wavelength, there has been a problem that when the incident light has a bandwidth in the wavelength, the linearity of the linearly polarized incident light is deteriorated when it is output from the element.

Considering the above-mentioned circumstances, it is an object of the present invention to provide a multi-layer diffraction type polarizer and a liquid crystal element capable of realizing a stable and high extinction ratio.

Further, considering the above-mentioned circumstances, it is another object of the present invention to provide a liquid crystal element for rotating the polarization direction of a linearly polarized light incident on the device and outputting the light maintaining the high linearity.

DISCLOSURE OF THE INVENTION

The present invention provides a multi-layer diffraction type polarizer comprising a lamination of at least two polarizing diffraction gratings each comprising a birefringent material, wherein the diffraction gratings each straightly transmits incident light having a first polarization direction without functioning as a diffraction grating, and diffracts incident light having a second polarization direction perpendicular to the first polarization direction by functioning as a diffraction grating.

Further, the present invention provides the multi-layer diffraction type polarizer, wherein each of the polarizing diffraction gratings comprises a birefringent material layer formed on a transparent substrate and having an ordinary refractive index of $n_o$ and an extraordinary refractive index of $n_e$ ($n_o \ne n_e$), the birefringent material layer being processed to have a periodical concavo-convex shape having a step height of d in cross section, a homogeneous refractive index transparent material having a refractive index equal to $n_o$ or $n_e$ is filled in at least the concave portions, and the retardation value $|n_e - n_o| \times d$ is $(m+\frac{1}{2})$ times (m is zero or a positive integer) the wavelength $\lambda$ of the incident light.

Further, the present invention provides the above multi-layer diffraction type polarizer, wherein the step heights d of the polarizing diffraction gratings are different from each other.

Further, the present invention provides a liquid crystal element comprising a liquid crystal cell comprising transparent substrates having electrodes and a liquid crystal layer sandwiched between them, the liquid crystal cell having a retardation value for a linearly polarized light having a wavelength of $\lambda$ incident and transmitted through the liquid crystal cell, the retardation value changing from $R_1$ to $R_2$ ($R_1 > R_2 > 0$) when the voltage applied between the electrodes is changed from $V_1$ to $V_2$ ($V_1 \ne V_2$); and a phase plate having a retardation value R for a linearly polarized light having a wavelength of $\lambda$, the retardation value R satisfying a relation $R+R_v = m \times \lambda$ (m: integer) with a retardation value $R_v$ generated by the voltage satisfying $R_1 \geq R_v \geq R_2$.

Further, the present invention provides a liquid crystal element, wherein the liquid crystal in the liquid crystal element is a nematic liquid crystal, and the alignment of the liquid crystal molecules is a parallel alignment in which the liquid crystal molecules are aligned in parallel in one direction between the transparent substrates when the voltage is not applied, the first phase plate satisfies a relation $R+R_v=0$, and the fast axis direction of the first phase plate is within an angle of 45° to the slow axis direction of the liquid crystal layer.

Further, the present invention provides the liquid crystal element, which further comprised a polarizing diffraction grating comprising a birefringent material at at least one of the light input side or the light output side of the liquid crystal element, wherein the diffraction grating straightly transmits incident light having a first polarization direction without functioning as a diffraction grating, and diffracts incident light having a second polarization direction perpendicular to the first polarization direction by functioning as a diffraction grating.

Further, the present invention provides a liquid crystal element having a $\lambda/4$ phase plate, comprising a liquid crystal cell comprising substrates having electrodes and a liquid crystal layer sandwiched between them, the liquid crystal cell having a retardation value changeable for incident linearly polarized light having a wavelength of $\lambda$, depending on the magnitude of a voltage applied between the electrodes; and a $\lambda/4$ phase plate producing a phase-shift corresponding to a retardation value of substantially $\lambda/4$ for the linearly polarized incident light, the $\lambda/4$ phase plate having an organic thin film and the alignment direction of molecules constituting the organic thin film is in parallel with the plane of the phase plate;

wherein the fast axis direction of the λ/4 phase plate is at an angle of about 45° to the fast axis direction of the liquid crystal cell.

Further, the present invention provides the above liquid crystal element having a λ/4 phase plate, wherein the phase plate comprises a liquid crystal polymer as the organic thin film, and the phase plate and the liquid crystal cell are integrally formed.

Further, the present invention provides the above liquid crystal element having a λ/4 phase plate, wherein the phase plate comprises at least two liquid crystal polymer layers, the retardation values of the two liquid crystal polymer layers are different from each other, and the fast axis directions or the slow axis directions of the two liquid crystal polymer layers are different from each other.

Further, the present invention provides the above liquid crystal element having a λ/4 phase plate, which comprises the liquid crystal cell, a first liquid crystal polymer layer and a second liquid crystal polymer layer arranged in this order from light-input side, wherein with respect to the center wavelength λ of incident light, the retardation value of the first liquid crystal polymer layer is substantially λ/2, and the retardation value of the second liquid crystal polymer layer is substantially λ/4; and with respect to the polarization direction of the incident light, the fast axis direction of the first liquid crystal polymer layer and the fast axis direction of the second liquid crystal polymer layer are about 30 degrees and about −30 degrees respectively, or otherwise, the slow axis direction of the first liquid crystal polymer layer and the slow axis direction of the second liquid crystal polymer layer are about 30 degrees and about −30 degrees respectively.

BEST MODE FOR CARRYING OUT THE INVENTION

The present invention provides a multi-layer diffraction type polarizer comprising a lamination of at least two polarizing diffraction gratings, each having a birefringent material which straightly transmits incident light having a first polarization direction without functioning as a diffraction grating, and diffracts incident light having a second polarization direction by functioning as a diffraction grating. Such a construction produces an effect of increasing the extinction ratio.

First Embodiment of the Multi-Layer Diffraction Type Polarizer

Figure 1:
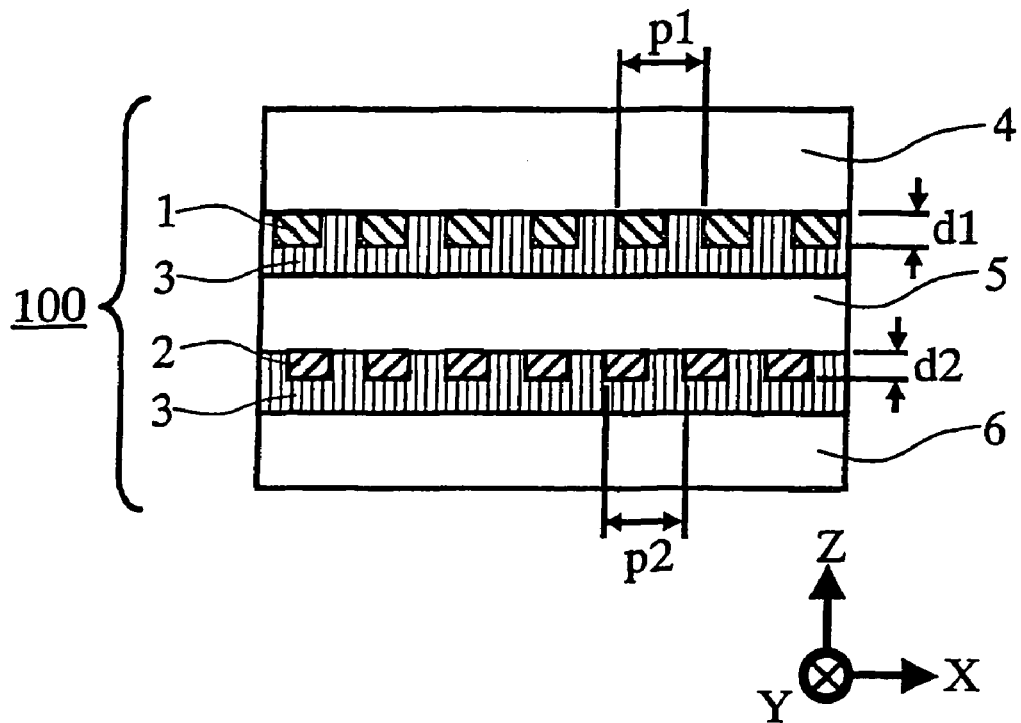
FIG. 1 is a side view showing an example of the construction of a multi-layer diffraction type polarizer of the present invention.

FIG. 1 is a side view showing a first embodiment of the construction of the multi-layer diffraction type polarizer of the present invention. On one side of each of a transparent substrate 4 and a transparent substrate 5, a birefringent material layer having an ordinary refractive index $n_o$ and an extraordinary refractive index $n_e$ ($n_o \neq n_e$), is formed so that its fast axis (the direction in which the refractive index becomes the ordinary refractive index) is in the direction of X-axis in FIG. 1. Then, the birefringent material layers are processed to be a diffraction grating 1 having a periodical structure whose cross-sectional shape is a concavo-convex shape with a step height of $d_1$ and a grating pitch of $p_1$, and a diffraction grating 2 having a periodical structure whose cross-sectional shape is a concavo-convex shape with a step height of $d_2$ and a grating pitch of $p_2$.

Then, at least concave portions of them are filled with a homogeneous refractive index transparent material 3 having a refractive index $n_s$ (which is equal to the ordinary refractive index $n_o$ or the extraordinary refractive index $n_e$) to form polarizing diffraction gratings on the transparent substrate 4 and the transparent substrate 5, and thereafter, the transparent substrate 4, the transparent substrate 5 and the transparent substrate 6 are laminated to form a multi-layer diffraction type polarizer 100. Here, "at least concave portions" means that either only the concave portions are filled or both the concavo and convex portions are filled to be covered. Here, the homogeneous refractive index transparent material means a transparent material whose refractive index is isotropic. The longitudinal directions as the direction of grooves of the convex portions of the grating on the transparent substrate 4 and that of the transparent substrate 5 may be in parallel or perpendicular or at a predetermined angle to each other. Since diffracted light produced by the diffraction grating is in a direction perpendicular to the longitudinal direction of the grating, it is possible to produce the diffracted light in a desired direction by making the longitudinal directions of the diffraction grating 1 and the diffraction grating 2 to have a predetermined angle.

Here, it is preferred, for example, to employ a homogeneous refractive index transparent material 3 having a refractive index $n_s$ substantially equal to the ordinary refractive index $n_o$, and to make the step heights $d_1$ and $d_2$ so that each of the retardation values $|n_e-n_s|\times d_1$ and $|n_e-n_s|\times d_2$ becomes $(m+\frac{1}{2})$ times (m is 0 or a positive integer) the wavelength of incident light from the following reasons. The reason is that the intensity of the straightly transmitted light of the incident light having the second polarization direction thereby becomes minimum, and a high extinction ratio can be obtained. Here, the $(m+\frac{1}{2})$ includes a magnification range of within ±10% from $(m+\frac{1}{2})$, since the effect of the present invention does not change in this range.

When an extraordinary polarized light (S polarized light: polarized light vibrating in a direction perpendicular to the surface of the drawing) is incident on such a multi-layer diffraction type polarizer 100, each of the polarizing diffraction gratings, i.e. a diffraction grating 1 and a diffraction grating 2 of the present invention, functions as a diffraction grating having a periodical distribution of refractive index $n_e$ and refractive index $n_s$ derived from the periodical structure of concavo-convex shape to produce diffracted light. Hereinafter, the diffraction grating 1 means a polarizing diffraction grating 1 comprising the diffraction grating 1, and the diffraction grating 2 means in the same manner.

In order to reduce the dependency of the diffraction efficiency on wavelength and to reduce the step height to be formed in the multi-layer diffraction type polarizer, each of the retardation values $|n_e-n_s|\times d_1$ and $|n_e-n_s|\times d_2$ is preferably made to be ½ times the wavelength of the output light (which corresponds to m=0). Here, the ½ times includes a magnification variation of within ±10% in the same manner as described above. Namely, the magnification may be within a range of from 0.55 to 0.45.

Here, since a part of an extraordinary polarized light (S polarized light) straightly transmitted through the diffraction grating 2 without being diffracted is diffracted by the diffraction grating 1, the extraordinary polarized light straightly transmitted through the multi-layer diffraction type polarizer 100 is minimized.

On the other hand, when an ordinary polarized light (P polarized light: polarized light vibrating in the direction parallel to the drawing surface) is incident into the multi-layer diffraction type polarizer 100, the diffraction grating 1 and the diffraction grating 2 of the present invention become equivalent to media having the refractive index $n_s$ even if they have concavo-convex periodical structures, and therefore, the incident light is straightly transmitted without being diffracted.

Therefore, by laminating the diffraction grating 1 and the diffraction grating 2 each having a transmittance of at least 90% for ordinary polarized light and a transmittance of at most 5% for extraordinary polarized light having a polarization direction perpendicular to the polarization direction of the ordinary polarized light, a multi-layer diffraction type polarizer can be obtained which makes straightly transmitted light at most 0.5% of the incident light if the extraordinary polarized light is incident.

Figure 2:
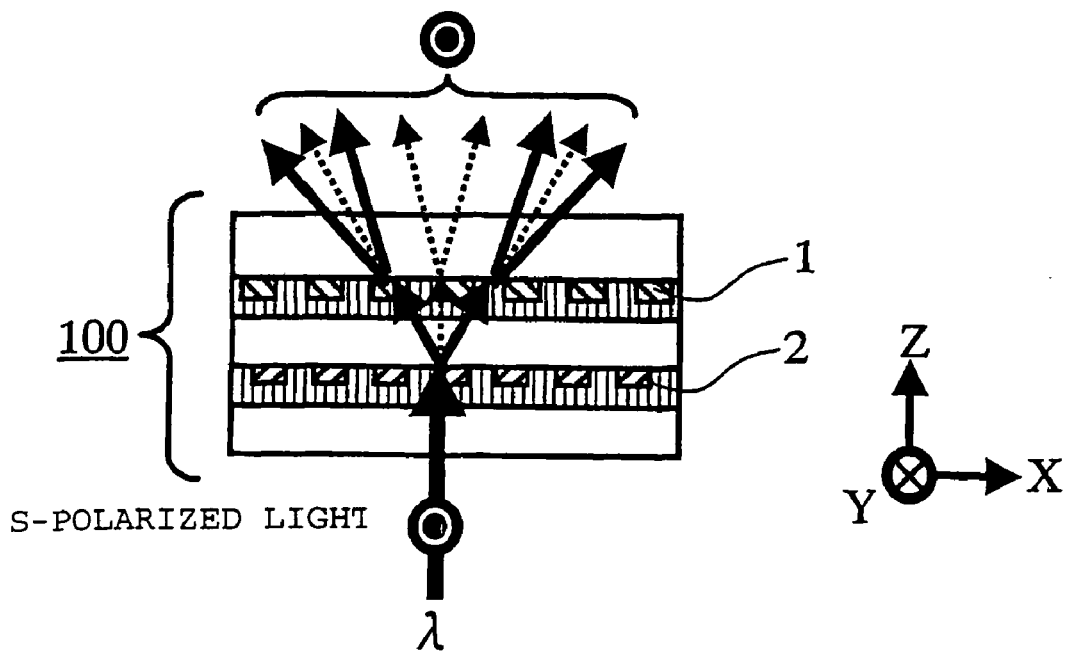
FIG. 2 is a side view showing the function of the multi-layer diffraction type polarizer shown in FIG. 1 when an extraordinary polarized light is incident.
Figure 3:
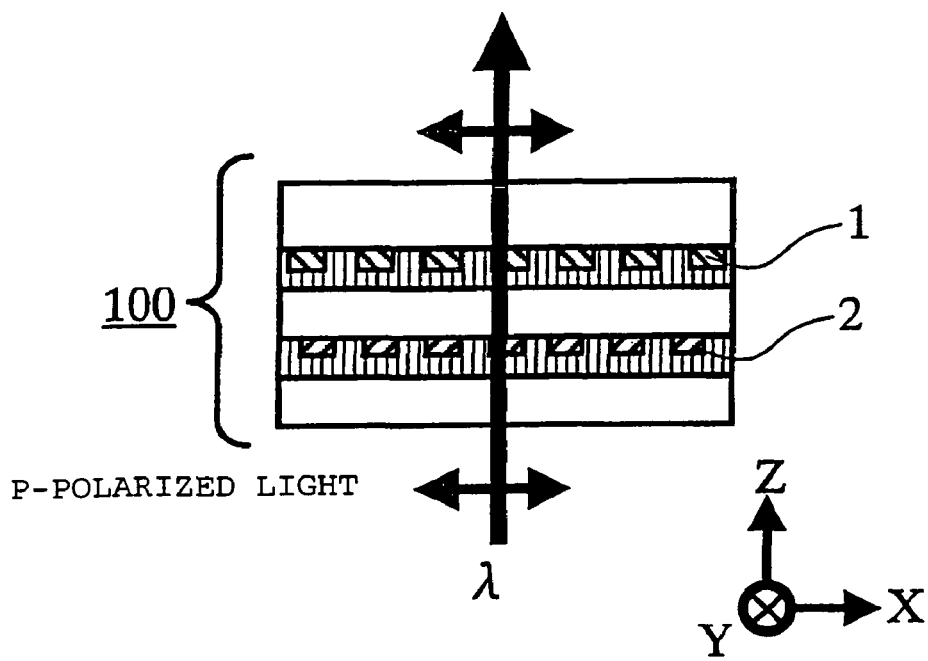
FIG. 3 is a side view showing the function of the multi-layer diffraction type polarizer shown in FIG. 1 when an ordinary polarized light is incident.

Here, as shown in two types of diffraction grating patterns in FIG. 2 and in FIG. 1, the diffraction grating 1 is formed to be a linear grating having a grating pitch of $p_1$ and to have an angle of $\theta_1$ between longitudinal direction of the grating and the X-axis, and the diffraction grating 2 is formed to be a linear grating having a grating pitch of $p_2$ and to have an angle of $\theta_2$ between the longitudinal direction of the grating and the X-axis.

In general, when light diffracted by the diffraction grating 2 is diffracted again by the diffraction grating 1 and superposed on the straightly transmitted light, a straightly transmitted component of the light is increased and the extinction ratio is deteriorated as a result. However, by making the grating pitch $p_1$ and the grating pitch $p_2$ different from each other or by making the angle $\theta_1$ and the angle $\theta_2$ of the grating longitudinal directions different from each other, such a deterioration of the extinction ratio can be prevented. Namely, the diffraction grating 1 and the diffraction grating 2 as the constituents, are preferably formed so that their grating pitches or their longitudinal directions do not coincide with each other, whereby multi-diffraction light by the diffraction grating 1 and the diffraction grating 2 do not superpose on the straightly transmitted light, and the extinction ratio is not deteriorated. Even if the step heights $d_1$ and $d_2$ of the diffraction gratins are equal, the extinction ratio is not deteriorated as long as $p_1$ and $p_2$ or $\theta_1$ and $\theta_2$ are different from each other.

Figure 5:
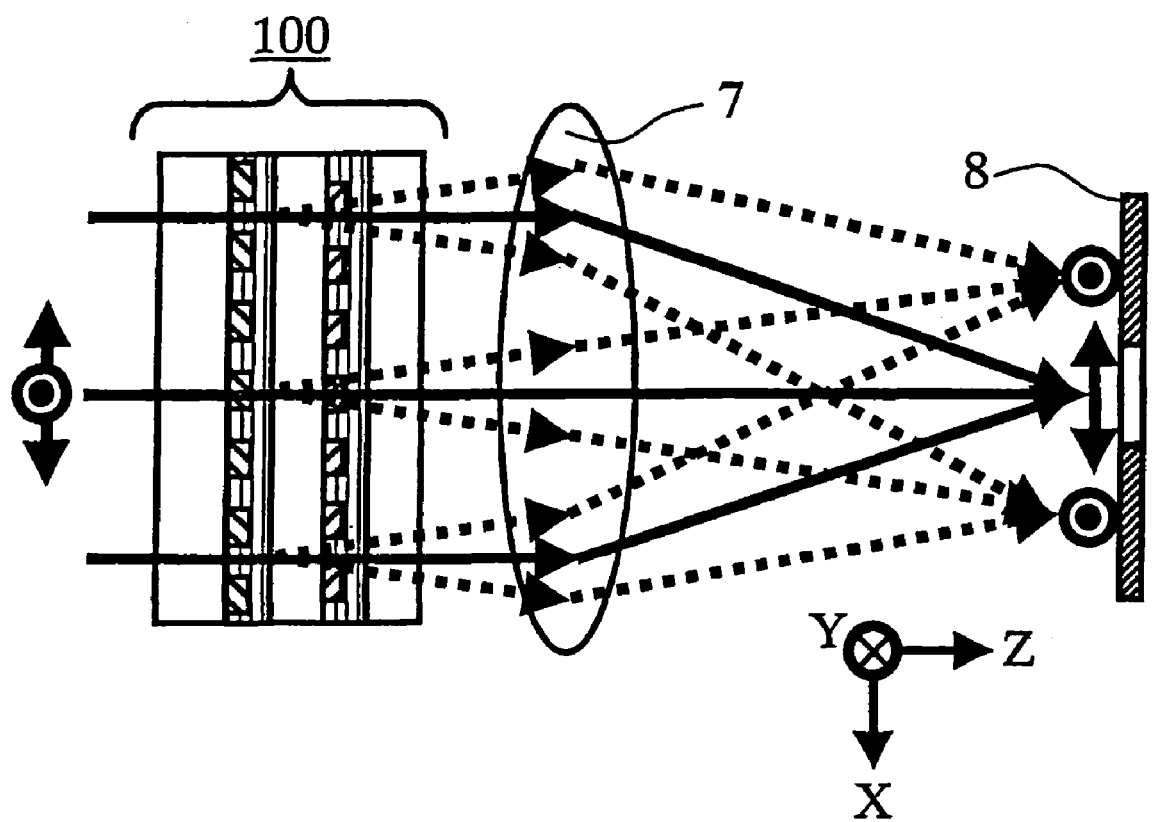
FIG. 5 is a side view showing an example of an optical system for separating straightly transmitted light and diffraction light, comprising the multi-layer diffraction type polarizer shown in FIG. 1.

FIG. 5 is a side view showing an example of the construction of the optical system of an isolator having a high extinction ratio employing the multi-layer diffraction type polarizer 100 of the present invention. A parallel light as a mixture of the ordinary polarized light and the extraordinary polarized light is incident on the multi-layer diffraction type grating 100, and a condenser lens 7 is provided at the output side, whereby the ordinary polarized light straightly transmitted through the multi-layer diffraction type polarizer 100 is focused on the focal plane on the optical axis of the condenser lens 7. On the other hand, the extraordinary polarized light diffracted by the multi-layer diffraction type polarizer 100 is focused on the focal plane off the optical axis of the condenser lens 7.

Accordingly, by providing an aperture 8 having an opening on the focal plane on the optical axis of the condenser lens 7, an isolator which transmits only ordinary polarized light and shutters extraordinary polarized light, is formed. Here, by providing a photodetector having a photo acceptance area corresponding to the opening instead of the aperture 8, only the ordinary polarized light component can be detected. Further, by providing the core of an optical fiber for transmitting light instead of the opening of the aperture, only the ordinary polarized light can be transmitted.

Figure 6:
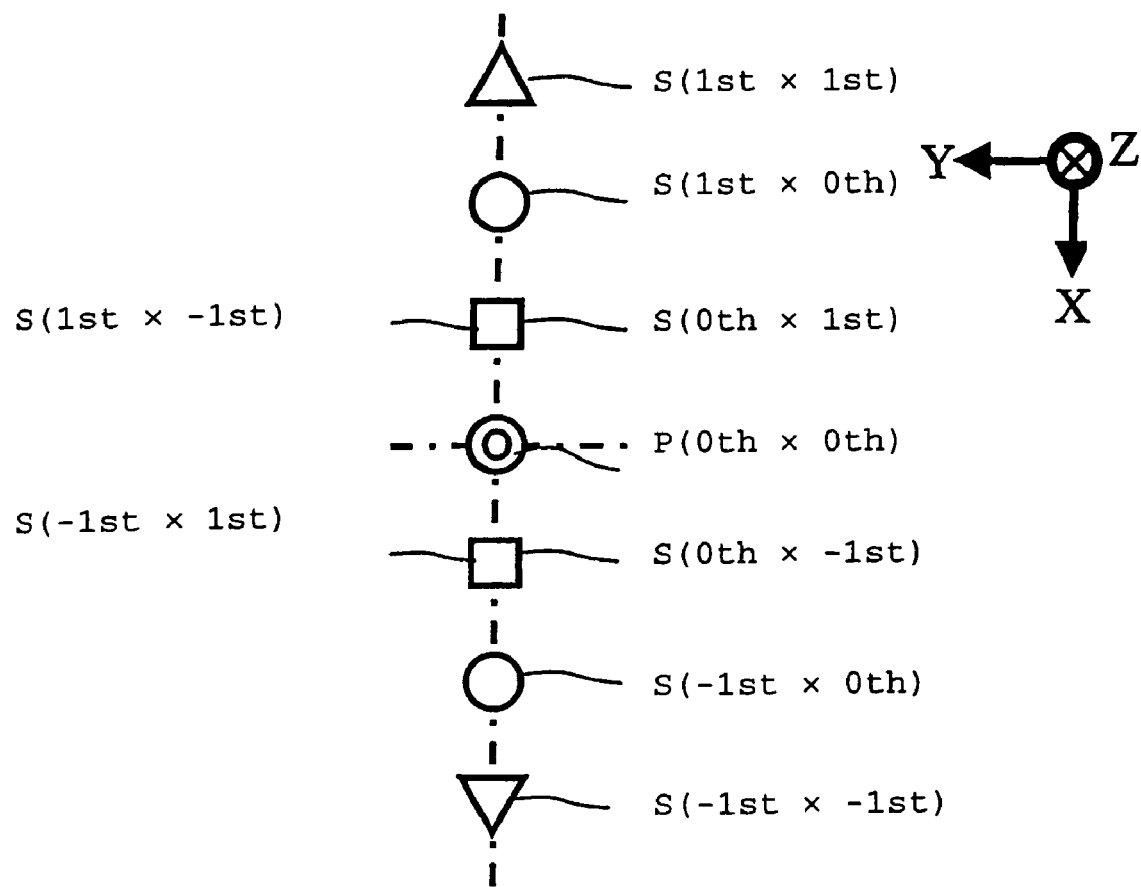
FIG. 6 is a plan view showing an example of focusing positions of straightly transmitted light and diffracted light of the light transmitted through the multi-layer diffraction type polarizer shown in FIG. 1, on the focal plane of a condenser lens.

FIG. 6 shows an example of focusing positions of straightly transmitted light and diffracted light formed on the focal plane of the condenser lens 7 in FIG. 5 in a case that $\theta_1=\theta_2=0°$ and $p_2$ is twice as large as $p_1$ when a diffraction grating 1 having an angle $\theta_1$ in the longitudinal direction of the grating and a grating pitch of $p_1$ and a diffraction grating 2 having an angle $\theta_2$ in the longitudinal direction of the grating and a grating pitch of $p_2$, are employed.

The ordinary polarized light (P polarized light) is not diffracted by the diffraction grating 1 and the diffraction grating 2 (the 0th order diffraction light becomes again the 0th order diffraction light) and focused at the position indicated by ⊚ on the optical axis.

This is referred to as 0th×0th.

Further, extraordinary polarized light beams (S polarized light) diffracted by the diffraction grating 1 and the diffraction grating 2 as diffracted light beams of the same sign and the same order number (±1st order diffraction light beams are further diffracted and all of them become ±1st order diffraction light beams) are focused at positions designated by Δ or ∇. They are designated as 1st×1st and −1st×−1st, and vice versa.

Further, extraordinary polarized light beams diffracted by the diffraction grating 1 as ±1st order light beams but not diffracted by the diffraction grating 2 and transmitted as 0th order diffracted light beams, are focused at positions designated by ○.

Further, extraordinary polarized light beams diffracted by the diffraction grating 2 as ±1st order light beams but not diffracted by the diffraction grating 1 (0th order diffracted light beams), and extraordinary polarized light beams diffracted by the diffraction grating 1 and the diffraction grating 2 as different signs and different order numbers (a +1st order diffracted light beam is diffracted as a −1st order diffracted light beam, or a −1st order diffracted light beam is diffracted as a +1st order diffracted light beam), are focused at positions designated as □.

The diffraction direction of an extraordinary polarized light beam is determined by the grating longitudinal direction angles $\theta_1$ and $\theta_2$ of the diffraction grating 1 and the diffraction grating 2, and the distance of the focusing positions of the diffracted light beams from the optical axis is determined by the wavelength of incident light, grating pitches $p_1$ and $p_2$, and the focal length of the condenser lens 7.

Second Embodiment of Multi-Layer Diffraction Type Polarizer

Birefringent material layers constituting the diffraction grating 1 and the diffraction grating 2 are preferably formed so that their step heights $d_1$ and $d_2$ are different from each other. Further, provided that the wavelength of the incident light is within a range of from $\lambda_1$ to $\lambda_2$, it is preferred that $d_1$ and $d_2$ are present between $\lambda_1/(2\times\Delta n)$ and $\lambda_2/(2\times\Delta n)$ which are ratios of the wavelengths $\lambda_1$ and $\lambda_2$ to the difference $\Delta n$ between the ordinary refractive index and the extraordinary refractive index of the birefringent material layer. By such a construction, a relatively high extinction ratio can be obtained for incident light having a wide wavelength band.

The second embodiment of the multi-layer diffraction type polarizer of the present invention will be described. When an extraordinary polarized light having a wavelength of λ is incident on the multi-layer diffraction type polarizer of this embodiment, the transmittance $\eta_0$ of the straightly transmitted light (0th order diffracted light) not diffracted by the diffraction grating 1 and the diffraction grating 2, is approximately described as $\eta_0=(\cos(\Phi(2))^2$. Here, $\Phi=2\times\pi\times\Delta n\times d/\lambda$, $\Delta n=|n_e-n_s|>0$, $n_o$ and $n_s$ are approximately equal, and $d=d_1$ in the diffraction grating 1 and $d=d_2$ in the diffraction grating 2.

Figure 7:
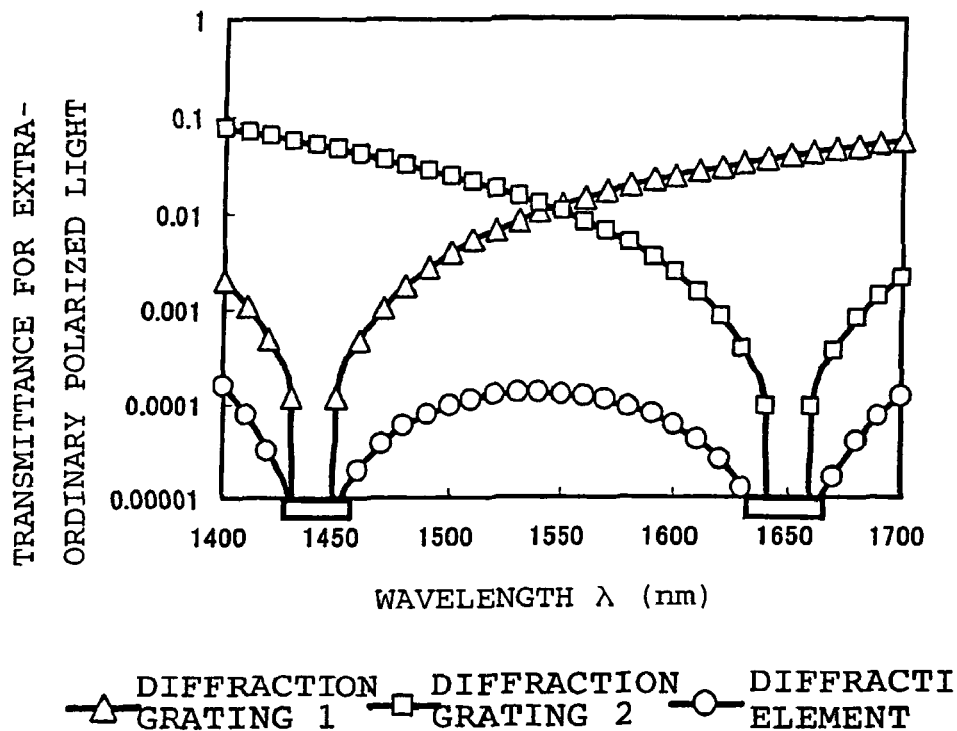
FIG. 7 is a graph showing an example of the wavelength-dependency (calculated) of the transmittance for the extraordinary polarized light of the multi-layer diffraction type polarizer of the present invention.

When the wavelength of the incident light is within a range of from $\lambda_1$ to $\lambda_2$, it is effective to make values of $d_1$ and $d_2$ different from each other within a range of from $\lambda_1/(2\times\Delta n)$ and $\lambda_2/(2\times\Delta n)$ in order to achieve high diffraction efficiency in this wavelength band. When the wavelength of the incident light is within a range of from 1400 to 1700 nm, and periodic structures of concavo-convex shape can be formed to have step heights of $d_1$=4.8 μm and $d_2$=5.5 μm employing a birefringent material of $\Delta n$=0.15, the wavelength-dependency of straight transmittance $\eta_0$ of the extraordinary polarized light is calculated and the result is shown in FIG. 7. Here, $\lambda_1/(2\times\Delta n)$=4.67 μm, $\lambda_2/(2\times\Delta n)$=5.67 μm, and $d_1$ and $d_2$ are values between them.

In FIG. 7, the straight transmittances $\eta_0$ in each of the diffraction grating 1 and the diffraction grating 2 for the extraordinary polarized light are designated as Δ and □ respectively, the straight transmittance $\eta_0$ of the multi-layer diffraction type polarizer 100 as a whole for extraordinary polarized light is designated as ○. The ordinary polarized incident light is scarcely diffracted and at least 90% of the incident light is straightly transmitted, and accordingly, the multi-layer diffraction type polarizer 100 functions as an isolator having an extinction ratio of at most −35 dB in a wavelength band of from 1400 to 1700 nm.

Here, by further laminating multi-layer diffraction type polarizers 100 of the present invention in series, a still higher extinction ratio can be obtained.

First Embodiment of Liquid Crystal Element

Then, a first embodiment of the liquid crystal element of the present invention will be described.

The liquid crystal element of the present invention is a liquid crystal element having the following construction. Namely, the liquid crystal element comprises a liquid crystal cell comprising transparent substrates having electrodes and a liquid crystal layer sandwiched between them, and when the voltage applied between the electrodes is changed from $V_1$ to $V_2$ ($V_1 \neq V_2$), the retardation value of the liquid crystal cell for a linearly polarized light having a wavelength of λ incident and transmitted, changes from $R_1$ to $R_2$ ($R_1 > R_2 > 0$). Further, the liquid crystal element comprises a phase plate having a retardation value R for the linearly polarized light having a wavelength of λ, satisfying a relation $R+R_v=m\times\lambda$ (m: integer) with $R_v$ where $R_1 \geq R_v \geq R_2$.

By thus constituting the liquid crystal element of the present invention, the liquid crystal element can produce a high extinction ratio at a low voltage. Now, the liquid crystal element of the present invention will be described in detail with reference to the drawings.

Figure 8:
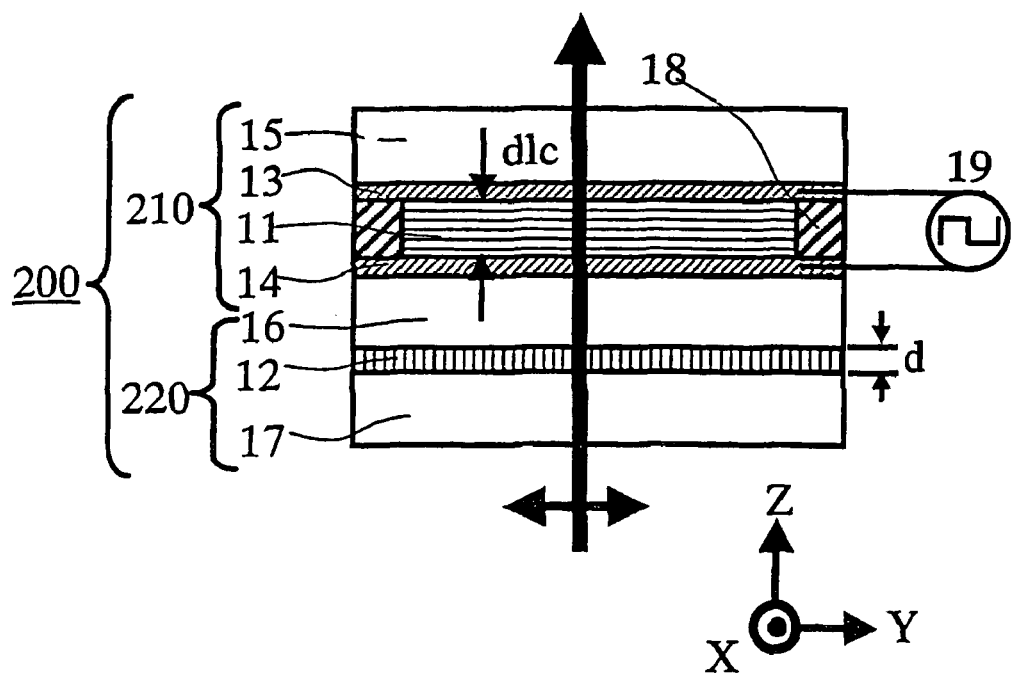
FIG. 8 is a side view showing an example of the construction of the liquid crystal element of the present invention.

FIG. 8 is a side view showing an example of the construction of the liquid crystal element of the present invention. Transparent electrodes 13 and 14 are formed on one side of transparent substrates 15 and 16 respectively, and on the top of the transparent electrodes 13 and 14, alignment layers (not shown) processed to have the same alignment direction are formed, and a sealing member 18 is employed to form a cell. Further, in the cell, a nematic liquid crystal having an ordinary refractive index of $n_o$ (lc) and an extraordinary refractive index of $n_e$ (lc) ($n_o$(lc)<$n_e$(lc)) is injected to form a liquid crystal layer 11, whereby a liquid crystal cell 210 in which the direction of liquid crystal molecules are aligned in parallel with the substrates can be obtained.

Further, the surfaces of the transparent substrate 16 and a transparent substrate 17 opposing to each other are coated with a solution for the alignment layer, the coated films are subjected to an alignment process in the same direction to form alignment layers (not shown), and a sealing member, not shown, are employed to form a cell. Further, in the cell, a solution of liquid crystal monomer is injected to form a liquid crystal monomer layer in which the direction of liquid crystal molecules are uniformly aligned in parallel with the substrates in the cell. The liquid crystal monomer layer is exposed to ultraviolet rays to be solidified, whereby a liquid crystal polymer layer 12 in which the alignment direction of liquid crystal molecules are fixed is formed and thus a phase plate 220 is obtained. Accordingly, a liquid crystal element 200 in which a liquid crystal cell 210 and a phase plate 220 are laminated, is obtained.

Figure 9:
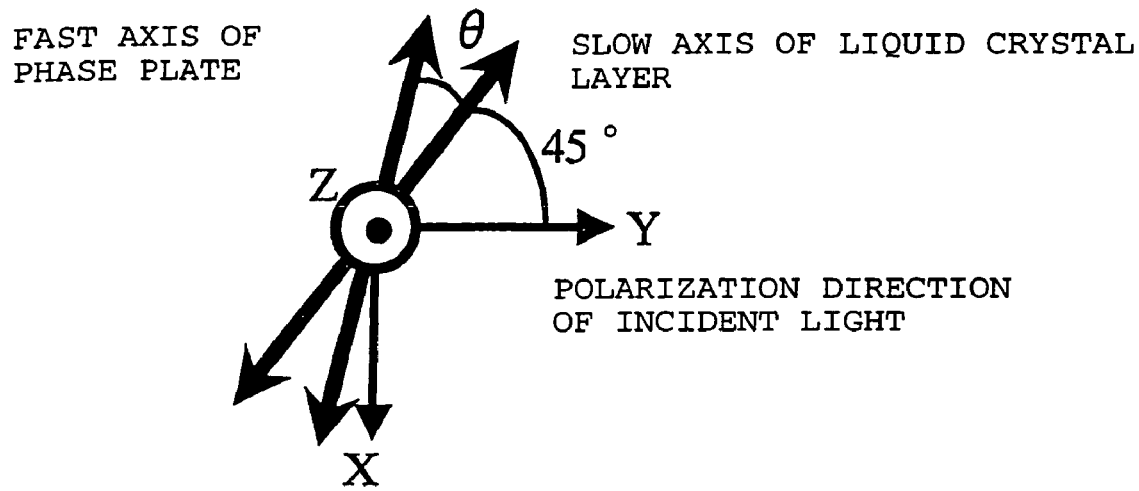
FIG. 9 is a plan view showing the relation between the slow axis direction of the liquid crystal element and the fast axis direction of the phase plate of the present invention.

Here, the slow axis direction (a direction providing the extraordinary refractive index $n_e$ (lc)) of the liquid crystal layer 11 made of a nematic liquid crystal, is at 45° to Y-axis as the polarization direction of incident light in FIG. 8 and FIG. 9. Further, the fast axis direction (a direction providing the ordinary refractive index $n_o$) of the phase plate 220 made of the liquid crystal polymer layer 12 having an ordinary refractive index of $n_o$ and an extraordinary refractive index of $n_e$ ($n_o < n_e$), is formed at an angle $\theta$ to the slow axis direction of the liquid crystal layer 11.

Here, the retardation value described in this embodiment means the difference between optical path of a polarized light polarized in the fast axis direction of the liquid crystal layer 11, and optical path of a polarized light polarized in the slow axis direction of the liquid crystal layer 11. Therefore, a negative retardation value may exist.

Here, the angle $\theta$ between the fast axis direction of the phase plate and the slow axis direction of the liquid crystal layer 11 is preferably formed to be at most 45°. If the angle $\theta$ is at most 45°, the retardation value R of the phase plate becomes a negative value cancelling the retardation value $R_v$ present when the voltage is applied. If the angle $\theta$ exceeds 45°, R becomes a positive value and it becomes difficult to cancel $R_v$.

Usually, the fast axis direction of the liquid crystal polymer layer 12 is made to be the same ($\theta=0$) as the slow axis direction of the liquid crystal layer 11. Namely, the fast axis direction of the liquid crystal polymer layer 12 is at an angle of 45° to the polarization direction of incident light.

Here, the thickness dlc of the liquid crystal layer 11 is made $0.5\lambda/\Delta n(lc)$ so that for the linearly polarized light polarized in the direction of Y-axis and having a wavelength $\lambda$, the retardation value of the liquid crystal cell 210 becomes approximately $\lambda/2$ when the voltage from AC power source 19 is not applied. Here, $\Delta n(lc) = n_e(lc) - n_o(lc)$.

The transparent electrodes 13 and 14 of the liquid crystal cell 210 thus obtained, are applied with AC voltage of rectangular waves having a voltage amplitude of V from the AC power source 19, whereby the retardation value of the liquid crystal cell 210 is decreased to be a definite value $R_v$ but not 0. In order to make the retardation value of the liquid crystal element zero by applying a voltage having an amplitude V, only the retardation value R of the phase plate 220 has to be adjusted (to be $-R_v$) to cancel the above retardation value $R_v$. Namely, in a case where the fast axis direction of the liquid crystal polymer layer 12 coincides with the slow axis direction of the liquid crystal layer 11, only the thickness d of the liquid crystal polymer layer 12 has to be made $R_v/\Delta n$. Here, $\Delta n = n_e - n_o$.

If the retardation value $R_v$ is large, the retardation value of the liquid crystal cell 210 may be adjusted to be $\lambda/2 + R_v$ in advance considering the reduction amount $R_v$ since the retardation value of the liquid crystal element when the voltage is not applied becomes a value smaller than $\lambda/2$ by $R_v$.

By arranging in the thus formed liquid crystal element 200, a polarizer for transmitting only the linearly polarized light polarized in the direction of X-axis at the light output side of the liquid crystal element 200, when a linearly polarized light polarized in the direction of Y-axis and having a wavelength $\lambda$ is incident into the liquid crystal element 200, an optical attenuator is formed. By this construction, the light is almost entirely transmitted when the voltage is not applied, and the light is shuttered by the polarizer when the voltage is applied (applied voltage V), whereby an optical attenuator having a high extinction ratio corresponding to the extinction ratio of the polarizer can be achieved, such being preferred.

The above description has been made with respect to a case where the retardation value of the liquid crystal element is substantially $\lambda/2$ when the applied voltage zero, and where it is zero when the applied voltage is V. However, the construction may be such that the retardation value may be a value different from $\lambda/2$ or zero.

The range of the applied voltage to the liquid crystal cell 210 is from $V_1$ to $V_2$ ($V_1 \neq V_2$), and in this voltage range, the retardation value changes from $R_1$ to $R_2$. In order to obtain an optical attenuator having a high extinction ratio at a given voltage V within the above voltage range, a retardation value $R_v$ of the liquid crystal cell 210 produced at the voltage V and the retardation value R of the phase plate 220, satisfy a relation that $R+R_v=m\times\lambda/2$ (m: integer) for a linearly polarized incident light having the same wavelength $\lambda$. Here, $R_v$ satisfies a relation that $R_1 \geq R_v \geq R_2$.

Here, when m is an odd number, the polarization direction of a linearly polarized light transmitted through the polarizer should be arranged to be perpendicular to the polarization direction of the linearly polarized incident light to the liquid crystal element. On the other hand, when m is an even number, the polarization direction of the linearly polarized light transmitted through the polarizer should be made coincide with the polarization direction of the linearly polarized incident light to the liquid crystal element. By such constructions, the intensity of transmitted light becomes minimum at the applied voltage V in the range of from $V_1$ to $V_2$ and thus an optical attenuator having a high extinction ratio is realized. Since the dependency of the extinction ratio on wavelength becomes smaller as the absolute value of $R+R_v$ becomes smaller, usually m=0 is preferred but m=±1 or ±2 are also acceptable.

Further, the liquid crystal element preferably has a construction that liquid crystal to be employed in the liquid crystal element is a nematic liquid crystal, the alignment direction of liquid crystal molecules is a parallel alignment in which the liquid crystal molecules are uniformly aligned in an predetermined direction between the transparent substrates when the voltage is not applied, the phase plate satisfies a relation $R+R_v=0$, and the fast axis direction of the phase plate is at an angle of within 45° to the slow axis direction of the liquid crystal layer.

Further, a transparent substrate 16 is interposed between the liquid crystal layer 11 and the liquid crystal polymer layer 12 in FIG. 8. However, the construction may be such that the transparent electrode 14 and an alignment layer is formed on the liquid crystal polymer layer 12 on the transparent substrate 17 without employing the transparent substrate 16, to form a cell and the liquid crystal layer is formed thereafter.

FIG. 8 shows an example of the construction employing a phase plate made of a liquid crystal polymer. However, a phase plate made of a birefringent crystal such as quartz may also be employed. In such a case, a quartz waveplate on which a transparent electrode is formed may be employed as the transparent substrates 16 of the liquid crystal cell instead of the liquid crystal polymer layer 12 and the transparent substrates 16 and 17 in FIG. 8, whereby the size of the liquid crystal element can be reduced.

Further, FIG. 8 shows a construction employing transparent electrodes 13 and 14 as the electrodes of the liquid crystal cell. However, one of the electrodes may be a light-reflective electrode made of e.g. gold or aluminum to form a reflective crystal cell. In this case, the thickness of the liquid crystal layer can be a half of that of the transmissive type since the light goes and returns in the liquid crystal layer, which may lead to realize low voltage driving and quick response.

Liquid crystal to be employed is not limited to a nematic liquid crystal, and it may be a ferroelectric liquid crystal, an antiferroelectric liquid crystal or the like. Further, with respect to the alignment of liquid crystal molecules, besides the parallel alignment in which the alignment directions of alignment layers of the transparent substrates 14 and 15 are the same, a twisted alignment in which the alignment directions are at a specific angle to each other so that the alignment of liquid crystal molecules is twisted around an axis in the direction of the thickness of the liquid crystal layer. Further, depending on an aligning process for the alignment layer and the selection of the liquid crystal material, a vertical alignment in which the alignment direction of the liquid crystal molecules is perpendicular to the surface of the transparent substrates, or a so-called hybrid alignment structure in which the alignment direction of liquid crystal molecules is perpendicular to the surface of one transparent substrate and the direction of liquid crystal molecules is in parallel to the surface of the other transparent substrate surface, may also be employed. The liquid crystal material may be such one having a retardation value changeable by the application of a voltage, and the liquid crystal has only to have an alignment property. Among these liquid crystals, a nematic liquid crystal is preferably employed since stable liquid crystal alignment can be obtained.

Second Embodiment of the Liquid Crystal Element

Figure 10:
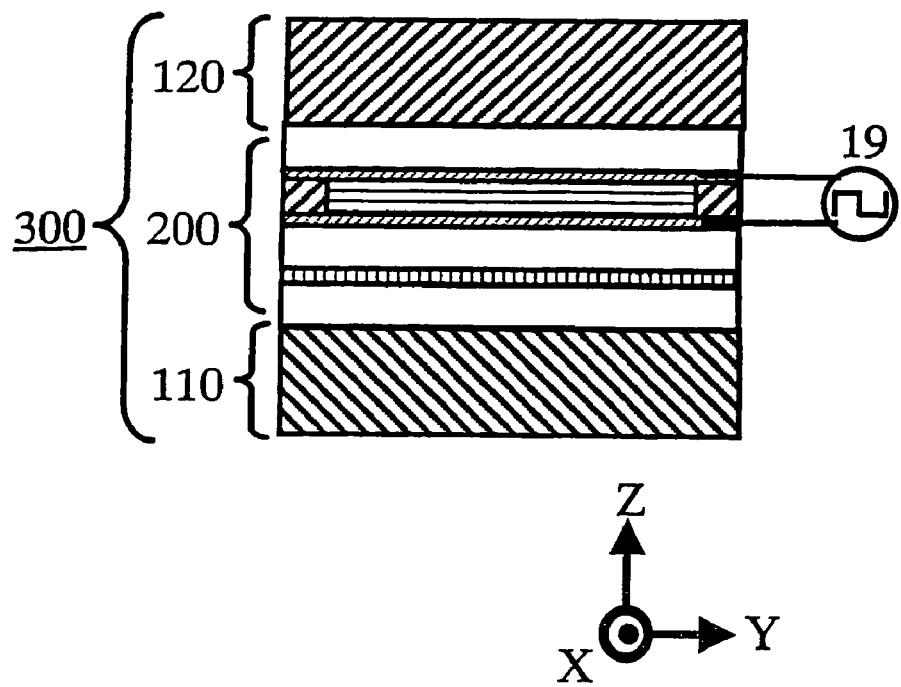
FIG. 10 is a side view showing an example of the construction of a complex type liquid crystal element of the present invention wherein the multi-layer diffraction type polarizer and the liquid crystal device are integrally formed.

FIG. 10 is a side view showing an example of the construction of the second embodiment of the liquid crystal element of the present invention comprising a multi-layer diffraction type polarizers 110 and 120 combined with a liquid crystal element 200.

It is preferred to constitute a complex type liquid crystal element comprising a multi-layer diffraction type polarizer described in the first and the second embodiments of the multi-layer diffraction type polarizer laminated on a surface of at least one of the transparent substrates of the liquid crystal cell described in the first embodiment of the liquid crystal element, since reduction of the size of the device and a stable extinction ratio can thereby be obtained.

Figure 4:
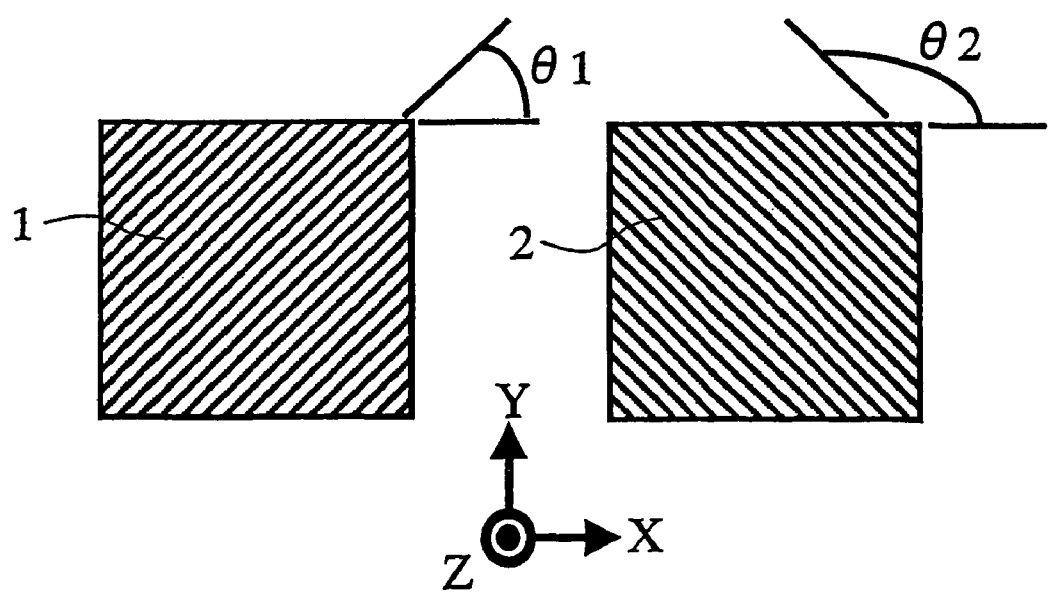
FIG. 4 is a plan view showing an example of two types of diffraction grating patterns constituting the multi-layer diffraction type polarizer shown in FIG. 1.

As shown in FIG. 10, the fast axis direction (the direction which provides the ordinary refractive index) of birefringent material layers constituting the multi-layer diffraction type polarizers 110 and 120 bonded to the liquid crystal element 200 by employing a transparent adhesive (not shown), is formed at an angle of 45° in a case of the multi-layer diffraction type polarizer 110, and at an angle of 135° in a case of the multi-layer diffraction type polarizer 120 with respect to X-axis in an XY plane in FIG. 4. Namely, two diffraction gratings in the multi-layer diffraction type polarizer 110 are linear type gratings, and longitudinal directions of their gratings are at an angle of 45° to X-axis direction. Two diffraction gratings in the multi-layer diffraction type polarizer 120 are also linear type gratings, and longitudinal directions of their gratings are at an angle of 135° to X-axis direction.

When light having a wavelength $\lambda$ is incident into the complex type liquid crystal element 300 having such structure from a side of the multi-layer diffraction type polarizer 110, a first linearly polarized light polarized at an angle of 45° to X-axis is transmitted without being diffracted by the multi-layer diffraction type polarizer 110, while a second linearly polarized light polarized in a direction at an angle of 135° to X-axis is transmitted after being diffracted by the multi-layer diffraction type polarizer 110, and thereafter, both of them are incident into the liquid crystal element 200.

When a voltage is not applied to the liquid crystal cell 210 of the liquid crystal element 200 (refer to FIG. 8), namely, when $V_1=0$, the liquid crystal cell 210 functions as a phase plate producing a phase difference $\pi$ for the first and second incident linearly polarized lights. Namely, since it functions as a ½ waveplate having a retardation value $R_1=\lambda/2$, the straightly transmitted light not diffracted by the multi-layer diffraction type polarizer 110 is converted to a linearly polarized light polarized at an angle of 135° to X-axis, and the transmitted light diffracted by the multi-layer diffraction type polarizer 110 is converted to be a linearly polarized light polarized at an angle of 225° to X-axis.

As a result, the straightly transmitted light not diffracted by the multi-layer diffraction type polarizer 110 is incident into the multi-layer diffraction type polarizer 120 as an ordinary polarized light, and straightly transmitted without being diffracted. On the other hand, the light diffracted by the multi-layer diffraction type polarizer 110 is incident into the multi-layer diffraction type polarizer 120 as an extraordinary polarized light, in which the incident light is diffracted. Accordingly, among these types of incident light in the complex type liquid crystal element 300, the first linearly polarized light is straightly transmitted without being diffracted, and the second linearly polarized light polarized in a direction perpendicular to the polarization direction of the first linearly polarized light, is diffracted and output. Here, since the longitudinal direction of the diffraction grating constituting the multi-layer diffraction type polarizer 110 is different from that of the diffraction grating constituting the multi-layer diffraction type polarizer 120, multi-diffraction light generated does not superpose the straightly transmitted light on the optical axis.

Further, by adjusting the retardation value R of a phase plate 220 so as to cancel the retardation value $R_v$ remaining in the liquid crystal layer 11 when a specific voltage V is applied to the liquid crystal cell 210 of the liquid crystal element 200 (refer to FIG. 8), the total of retardation values of the liquid crystal layer and the phase plate becomes $R+R_v=m\times\lambda$ (m: integer) and the incident light is not changed in its phase difference and is output maintaining the polarization.

As a result, the straightly transmitted light not diffracted by the multi-layer diffraction type polarizer 110 is incident into the multi-layer diffraction type polarizer 120 as an extraordinary polarized light, in which the light is diffracted. On the other hand, the transmitted light diffracted by the multi-layer diffraction type polarizer 110 is incident into the multi-layer diffraction type polarizer 120 as an ordinary polarized light and is not diffracted. Accordingly, among these types of incident light in the complex type liquid crystal element 300, both the first linearly polarized light and the second linearly polarized light are diffracted and output. Namely, the incident light is diffracted regardless of its polarization state and not present on the optical axis of straight transmission.

Therefore, by switching on/off the voltage applied to the liquid crystal cell 210, the straightly transmitted light is separated from the diffracted light. In FIG. 5, by disposing the complex type liquid crystal element 300 instead of the multi-layer diffraction type polarizer 100, a polarizer type switching device having a high extinction ratio can be realized. Further, by applying a predetermined voltage without switching on/off the applied voltage, the intensity of straightly transmitted light having a predetermined polarization direction can be adjusted to be a predetermined intensity, whereby the liquid crystal cell can function as a voltage variable optical attenuator.

This embodiment shown in FIG. 10 has a construction that the fast axes of the birefringent material layers of the multi-layer diffraction type polarizer 110 and the multi-layer diffraction type polarizer 120 are perpendicular to each other. However, the construction may be that they are in parallel with each other. In this case, the transmittance of the straightly transmitted light becomes minimum when the voltage is not applied to the liquid crystal cell ($V_1$=0) and maximum when the voltage is applied (V).

In FIG. 10, an example that the polarizing diffraction type polarizers are disposed at light input and output sides of the liquid crystal element 200. In a case where only a linearly polarized light component polarized in the same direction as the transmittable polarization of the input side polarizer is incident, a polarizing diffraction type polarizer needs to be disposed only at the light output side.

Figure 12:
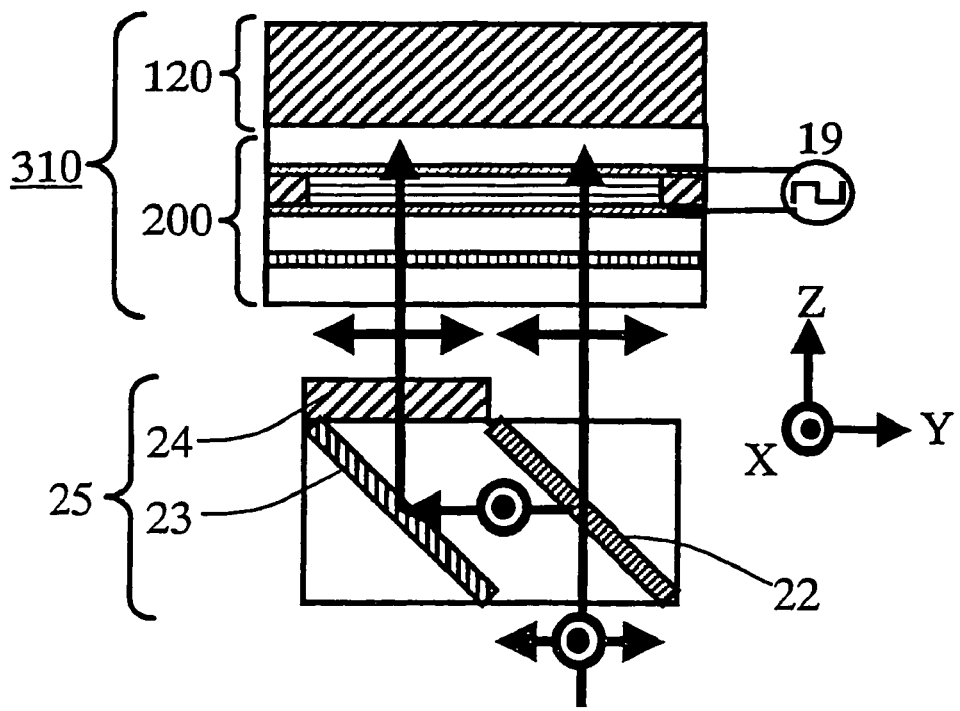
FIG. 12 is a side view showing an example of another construction of the complex type liquid crystal element of the present invention.

FIG. 12 shows an example of another construction of the complex type liquid crystal element comprising the multi-layer diffraction type polarizer 120 and the liquid crystal element 200 in combination. At the light input side of the liquid crystal element 200, a polarization conversion device 25 is disposed, which comprises a prism in which a polarization separator film 22 and a total reflective mirror 23 are formed, and a ½ waveplate 24 is bonded to the prism.

Among two types of linearly polarized incident light on the polarization conversion device 25, one type of linearly polarized light is transmitted through the polarization separator film 22. Another type of linearly polarized light polarized in a direction perpendicular to the one type of linearly polarized light is reflected by the polarization separator film 22 and the total reflective mirror film 23 to be introduced to the ½ waveplate 24 at which the polarization plane (polarization direction) is rotated by 90° so that it becomes linearly polarized light polarized in the same direction as the one type of linearly polarized light and incident into the complex type liquid crystal element 310. As a result, a switching device or an optical attenuator having low insertion loss can be realized regardless of the state of polarization of incident light.

Further, by patterning the transparent electrode layer 13 or 14 of the liquid crystal cell 210 and applying a voltage independently to each of the patterned electrodes, the spatial distribution of the transmittance can be adjusted in accordance with the patterned shape.

Further, in the polarizing diffraction type polarizer of the present invention, since the temperature rise of the liquid crystal element caused by light absorption is little, stable light attenuation can be obtained even under high intensity incidence of light as compared with a conventional light absorption type polarizer which absorbs a particular polarization component.

In this embodiment, an optical attenuator of high extinction ratio is realized by combining a multi-layer diffraction type polarizer comprising laminated diffraction type polarizers with the liquid crystal element. However, it is acceptable to combine a single polarizer with the liquid crystal element. In this case, the maximum extinction ratio is decreased and the wavelength bandwidth is further decreased.

As described above, by disposing a polarizing diffraction type polarizer at least one of the light input side and light output side of the liquid crystal element to form an integrated structure, reduction of the device size and stable performance can be obtained, such being preferred.

Third Embodiment of the Liquid Crystal Element

An embodiment of a liquid crystal element of the present invention which comprises a liquid crystal cell, and a phase plate having an organic material layer producing a phase difference corresponding to a retardation value of substantially λ/4 for linearly polarized incident light, wherein the fast axis direction of the liquid crystal cell is at an angle of about 45° to the fast axis direction of the phase plate, will be described.

The liquid crystal element of the present invention will be described employing a side view of FIG. 8. The structure of the liquid crystal cell is the same as that of the liquid crystal cell 210 of the first embodiment except that the structure of the phase plate 220 is different and that incident light is transmitted from a side of the liquid crystal cell 210 toward the phase plate 220.

Figure 13:
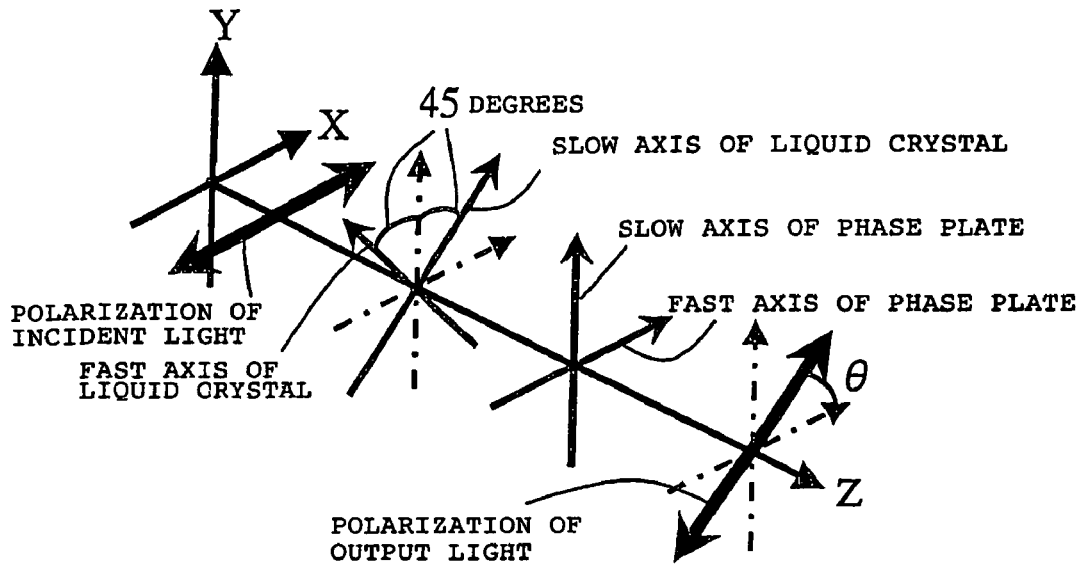
FIG. 13 is a view showing the relations among the fast and the slow axes of the liquid crystal, those of the phase plate constituting the liquid crystal element of the present invention and polarization directions.

FIG. 13 is a view illustrating a coordinate system showing the relation of the fast and slow axes of the liquid crystal and the phase plate constituting the liquid crystal element of the present invention and polarization directions.

In FIG. 8, the phase plate 220 comprises a liquid crystal polymer layer, which is obtainable by coating one side of each of the transparent substrates 16 and 17 opposed to each other with a layer to form an alignment layer, applying each of the layers an alignment treatment in the same direction to form alignment layers (not shown), and employing a seal member to form a cell. A solution of liquid crystal monomer is injected in the cell to form a liquid crystal monomer layer in which the direction of liquid crystal molecules are aligned in a direction parallel with the substrate surfaces in the cell, and irradiating ultraviolet rays to polymerize and solidify the liquid crystal monomer layer, whereby a liquid crystal polymer layer in which the alignment direction of liquid crystal molecules is fixed, is obtainable.

Here, the construction is made so that the fast axis direction (direction of ordinary refractive index $n_o$ (lc)) of the liquid crystal cell comprising the liquid crystal layer 11 is, for example, at an angle of 45° to the fast axis direction (direction of ordinary refractive index $n_o$) of the phase plate comprising the liquid crystal polymer layer 12 having an ordinary refractive index $n_o$ and an extraordinary refractive index $n_e$ ($n_o < n_e$).

In FIG. 13, it is determined so that the fast axis direction of the liquid crystal layer 11 is at an angle of 135° to X-axis being the polarization direction of incident light, and light is incident from a side of the liquid crystal cell 210. The angle between the fast axis direction of the liquid crystal cell and the fast axis direction of the phase plate may deviate from 45° as long as the effect of the present invention is maintained, and it may be from 40° to 50°.

Here, the thickness dlc of the liquid crystal layer 11 is made to be $0.5\lambda/(n_e(lc)-n_o(lc))$ so that the retardation value of the liquid crystal cell 210 becomes, for example, λ/2 for linearly polarized incident light, polarized in X-axis direction, having a wavelength λ when the voltage is not applied, and the retardation value of the phase plate 220 is made to be substantially λ/4. Here, the retardation value of the phase plate 220 may deviate from λ/4 so long as it is within a range in which there is an effect of maintaining the linearity of the linearly polarized output light from the liquid crystal element. Further, it may be a value an odd number times greater than λ/4.

When the rectangular AC voltage applied from the AC power source 19 to the transparent electrodes 13 and 14 of the liquid crystal cell 210 thus obtained is increased, the retardation value R of the liquid crystal cell 210 is changed to 0 from λ/2 which is the value when the voltage is not applied.

In a liquid crystal polymer, since the alignment direction of liquid crystal molecules is in parallel with the substrate surfaces, the retardation value does not change remarkably even if the incident angle as an angle at which the propagation direction of the incident light crosses the normal line of the phase plate, is tilted from 0° to about 20°, and the liquid crystal polymer functions as a stable λ/4 phase plate for incident light having a wavelength λ.

In the liquid crystal cell 210, since the rotation angle θ between the polarization direction of output light and that of incident light is represented by $\theta=180\times R/\lambda$ where R is the retardation value of the liquid crystal cell 210, $\theta$ is decreased from 90° to 0° as the applied voltage to the liquid crystal cell 210 is increased.

As described above, it is preferred that the liquid crystal employed for the liquid crystal element is a nematic liquid crystal, the alignment directions of liquid crystal molecules at both substrates each having electrodes are aligned in parallel in the same predetermined direction when the voltage is not applied, the phase plate has a liquid crystal polymer, and the liquid crystal cell and the phase plate are integrally formed. The reasons of the above construction are that the size of the device is thereby reduced, and that the angle at which the fast axis direction of the liquid crystal cell crosses the fast axis direction of the phase plate is thereby fixed and the stability of the optical performance is improved.

Further, in a case where light having a center wavelength $\lambda$ and a certain bandwidth of the wavelength, it is preferred to employ a phase plate constituted by laminating two liquid crystal polymer layers having retardation values and fast axis directions different from each other. By the lamination, the dependency of the retardation value on wavelength can be reduced, and deterioration of the linearity of the output linearly polarized light can be reduced.

Figure 14:
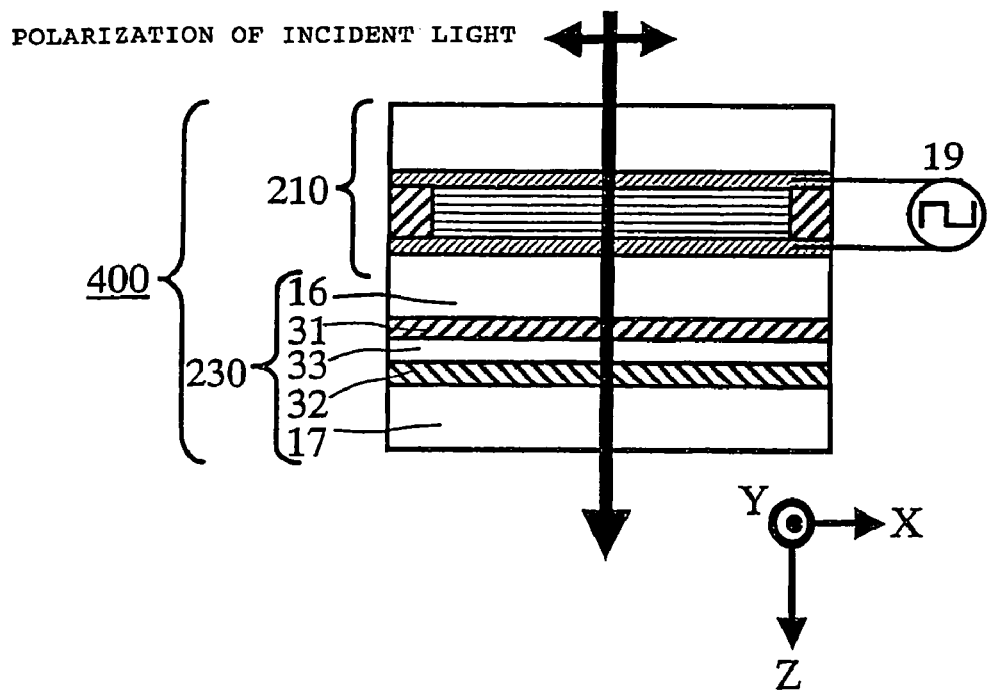
FIG. 14 is a side view showing another example of the construction of the liquid crystal element of the present invention.
Figure 15:
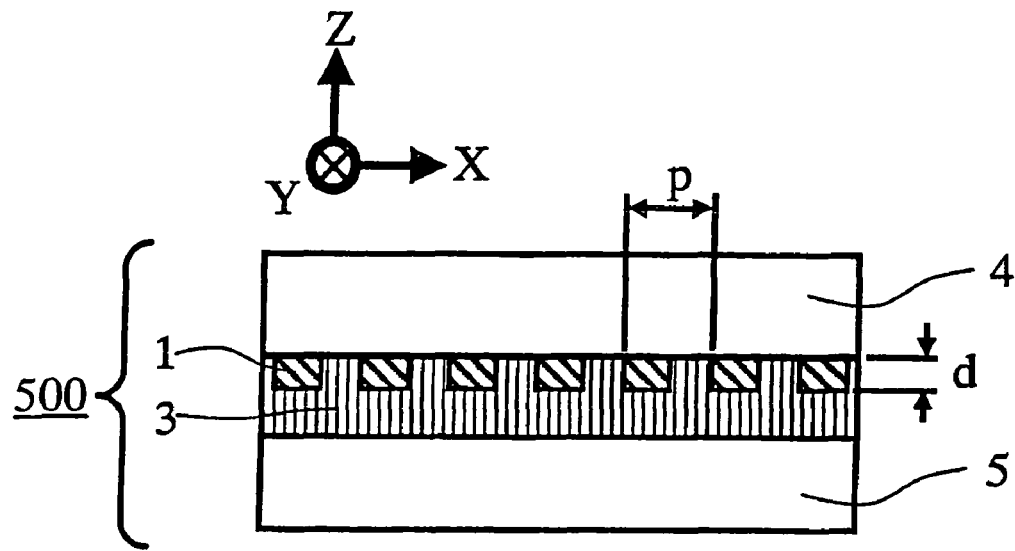
FIG. 15 is a side view showing an example of the construction of a conventional diffraction type polarizer.
Figure 16:
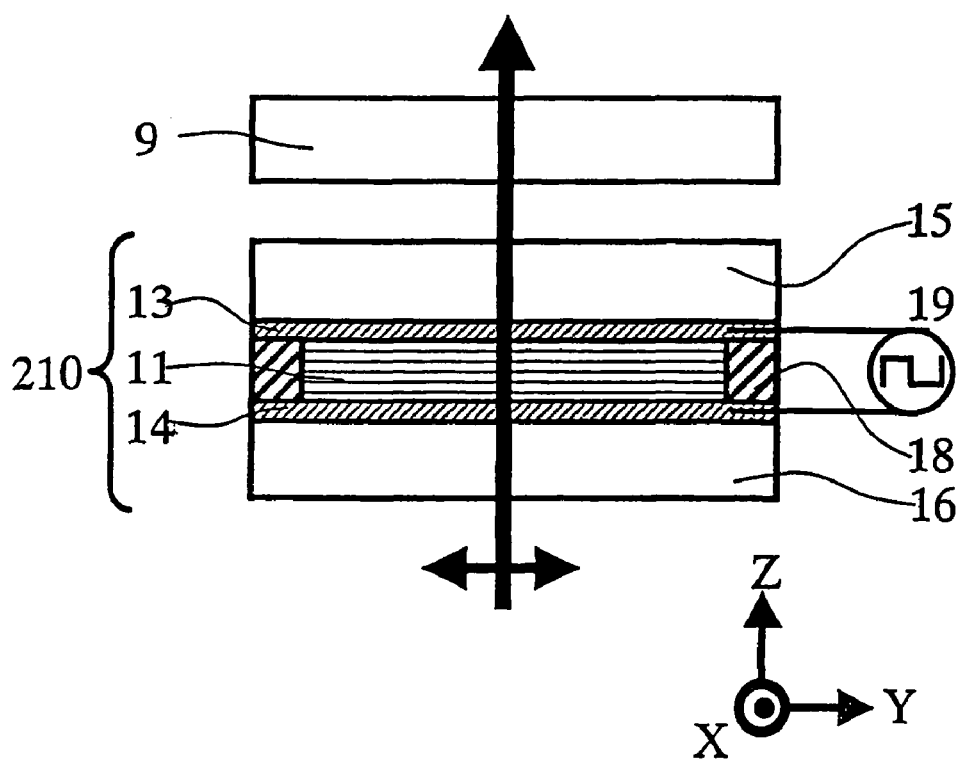
FIG. 16 is a side view showing an example of the construction of a conventional optical attenuator.
Figure 17:
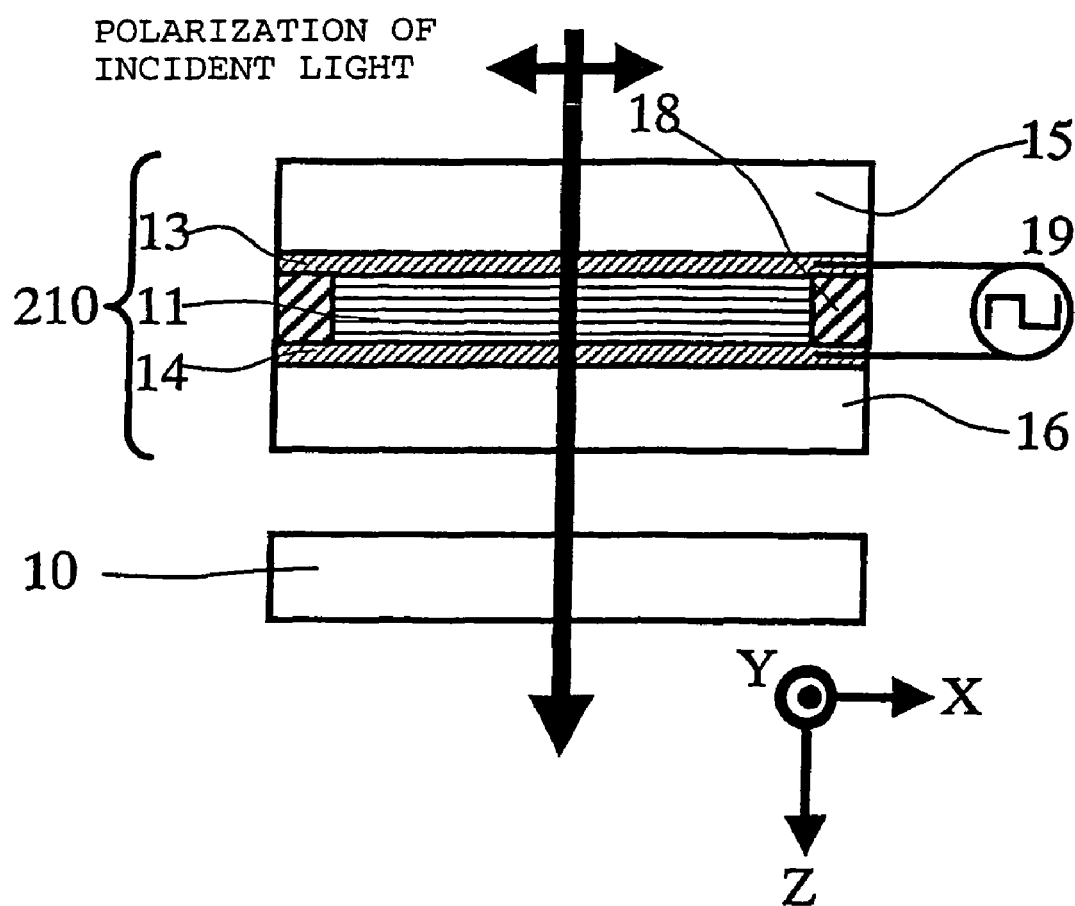
FIG. 17 is a side view showing an example of the construction of a conventional polarization rotator.

FIG. 14 is a side view showing another example of the construction of the liquid crystal element of the present invention employing such a phase plate.

The liquid crystal cell 210 has the same construction as in FIG. 8, in which a liquid crystal polymer layer 31 having a retardation value of, for example, $\lambda/2$ and a liquid crystal polymer layer 32 having a retardation value of, for example, $\lambda/4$ are formed one side of the transparent substrates 16 and 17 respectively, and they are bonded so as to sandwich the liquid crystal polymer layer by employing an adhesive 33 comprising a homogeneous refractive index transparent material to thereby form the phase plate 230.

Here, the alignment directions of liquid crystal molecules of the liquid crystal polymer layers are preferably aligned such that in the coordinate system shown in FIG. 13, with respect to the polarization direction of the incident light polarized in the direction of X-axis, the fast axis of the liquid crystal polymer layer 31 is at an angle of, for example, 30°, and the fast axis of the liquid crystal polymer layer 32 is at an angle of, for example, −30°. Here, the sign of the angle is defined so that the rotation angle from +X axis direction towards +Y axis direction has a positive sign. Here, the values $\lambda/2$ and $\lambda/4$ may deviate from these values so long as they are within ranges in which there is an effect of maintaining the linearity of the output linearly polarized light from the liquid crystal element. The 30° and −30° may each has a tolerance of ±5° from them.

Further, the alignment directions of liquid crystal molecules of the liquid crystal polymer layers may be aligned so that with respect to the polarization direction of the incident light polarized in the direction of X-axis, the slow axis of the liquid crystal polymer layer 31 is at an angle of about 30°, and the slow axis of the liquid crystal polymer layer 32 is at an angle of about −30°.

By thus constituting a liquid crystal element 400 comprising the phase plate 230 and the liquid crystal cell 210 integrally formed, high linearity of linearly polarized output light can be maintained even if light having a certain bandwidth in the wavelength is incident.

In the above example, an example of employing a liquid crystal polymer as the organic film of the phase plate having a function of generating phase difference, is shown. However, an organic film such as polycarbonate film stretched in one direction to impart a birefringence property may also be employed as the organic film.

Further, a phase plate, not shown, having a different optical axis from the liquid crystal layer may be laminated on the liquid crystal cell 210, whereby the voltage variable rotation angle of the output linearly polarized light can be adjusted.

Further, the multi-layer diffraction type polarizer of the present invention may be bonded to be fixed to the transparent substrate 17 at the light input side of the liquid crystal element 400, whereby only incident light having high linearity can be straightly transmitted, and thus it is easy to maintain the linearity of the output light from the liquid crystal element.

Now, Examples will be described.

Example 1

The multi-layer diffraction type polarizer of the present invention will be described employing FIG. 1. On respective one side of the transparent substrate 4 and the transparent substrate 5 made of glass substrates, liquid crystal polymer layers each having an ordinary refractive index $n_o=1.55$ and an extraordinary refractive index $n_e=1.70$ were formed as a birefringent material layer, and applied with photolithography and etching techniques to form linear diffraction gratings 1 and 2. The grating pitches $p_1$ and $p_2$ of the diffraction gratings 1 and 2 were 20 μm and 40 μm respectively, longitudinal directions of the gratings were in parallel with each other, and the depths of the convex portions of the liquid crystal polymer layers of the diffraction gratins 1 and 2, namely the step heights $d_1$ and $d_2$, were 4.8 μm and 5.6 μm respectively.

Further, concavo-convex portions of the liquid crystal polymer layers processed to have a concavo-convex form were filled with a homogeneous refractive index transparent material 3 made of a transparent resin having a refractive index of $n_s=1.55$, and a transparent substrate 6 made of a glass substrate was laminated thereon to produce a multi-layer diffraction type polarizer 100 as a lamination of a polarizing diffraction grating constituted by the diffraction grating 1 and a polarizing diffraction grating constituted by the diffraction grating 2. Here, the liquid crystal polymer layer was formed by injecting a solution of liquid crystal monomer into the spacing between the substrates each having an alignment layer (already subjected to an aligning treatment), and irradiating ultraviolet rays to the liquid crystal monomer to polymerize and solidify it. Further, antireflection films are formed in the interface between the transparent substrates 4 and 6, and air.

When a parallel light having a wavelength band of 1400 to 1700 nm was incident into the multi-layer diffraction type polarizer 100, an ordinary polarized light was hardly diffracted and 97% of the incident light was straightly transmitted. An extraordinary polarized light polarized in the direction perpendicular to the ordinary polarized light was almost entirely diffracted and at most 0.05% was straightly transmitted. As shown in FIG. 5, the transmitted light through the multi-layer diffraction type polarizer 100 was focused on the focal plane of a condenser lens 7 so that only the straightly transmitted light on the optical axis was focused to form an image at the core portion, not shown, of an optical fiber. As a result, an isolator having a high extinction ratio as a ratio of the extraordinary polarized light to the ordinary polarized light, of at most −30 dB in a wavelength band of 1400 to 1700 nm, was obtained.

Example 2

A liquid crystal element 200 of the present invention will be described employing FIG. 8. A nematic liquid crystal having an ordinary refractive index of $n_o$(lc)=1.50 and an extraordinary refractive index of $n_e$(lc)=1.66 was sandwiched between transparent substrates 15 and 16 having transparent electrodes 13 and 14 formed on one side of them respectively, to produce a liquid crystal cell 210 comprising a liquid crystal layer 11 having a thickness d (lc) of 5 µm. The slow axis direction of the liquid crystal layer 11 was at 45° to Y-axis direction shown in FIG. 9 and in parallel with the substrates.

The retardation value of the liquid crystal cell 210 was 0.8 µm ($R_1$) for light having a wavelength of 1.55 µm in a state that the voltage is not applied to the transparent electrodes 13 and 14, and when a linearly polarized light polarized in Y-axis direction was incident into the liquid crystal cell 210, the polarization direction of the linearly polarized light output from the liquid crystal cell 210 was in X-axis direction. Further, under the condition of applying a rectangular AC voltage having a voltage amplitude of 5 V, the retardation value $R_v$ of the liquid crystal cell 210 was 0.128 µm ($R_2$).

Further, a phase plate 220 was constituted wherein a liquid crystal polymer layer 12 sandwiched between the transparent substrates 16 and 17 had an ordinary refractive index of $n_o$=1.55, an extraordinary refractive index of $n_e$=1.59 and a thickness d of 3.2 µm. The liquid crystal element 200 was constituted by the phase plate 220 and the liquid crystal cell 210. Here, if the fast axis direction of the phase plate 220 is made coincide with the slow axis direction of the liquid crystal layer 11, namely if θ=0 in FIG. 9, the retardation value R of the phase plate 220 constituted by the liquid crystal polymer layer 12 becomes −0.128 µm and cancels the retardation value 0.128 µm present in the liquid crystal layer 11 when the applied voltage is 5 V. Namely, this corresponds to m=0 in m×λ=0.

Further, the same multi-layer diffraction type polarizer 120 as Example 1 was bonded to be fixed to the light output side of the liquid crystal element 200 to form a complex type liquid crystal element 310 (having a construction without a polarized light conversion element 25) shown in FIG. 12. Here, the polarization direction of diffracted light by the polarizer 200 is designated as Y-axis.

On the complex type liquid crystal element 310 thus produced, a linearly polarized parallel light polarized in Y-axis direction and having a wavelength of 1.55 µm was incident and the output light was focused by a condenser lens into an optical fiber, not shown.

Figure 11:
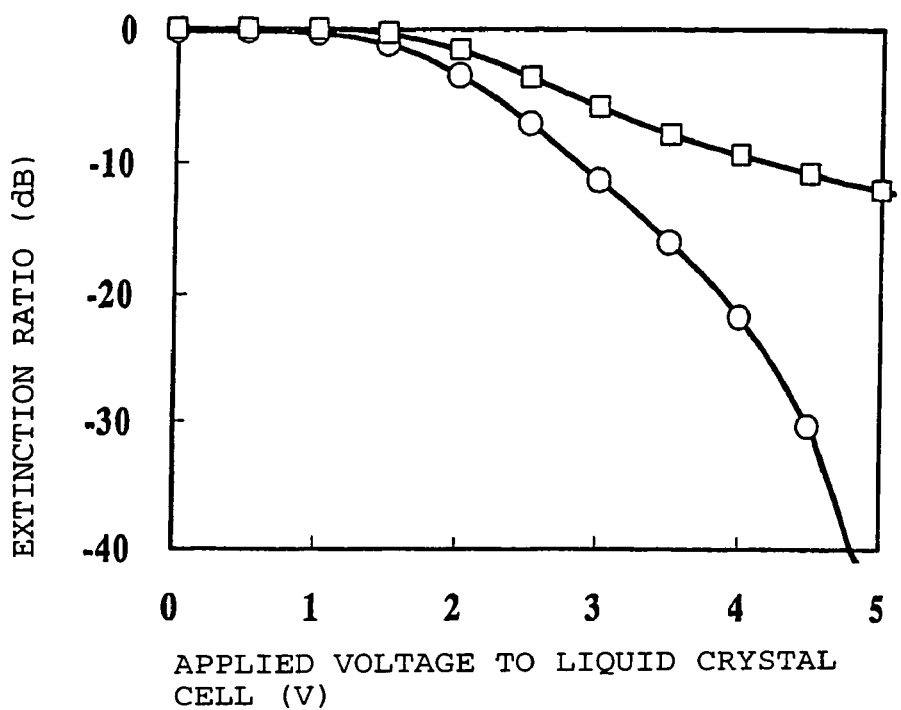
FIG. 11 is a graph showing the relations between the extinction ratio and the voltage applied to the liquid crystal cell in the complex type liquid crystal element of the present invention and a conventional liquid crystal element.

The voltage amplitude applied to the liquid crystal layer of the liquid crystal element was changed from 0 to 5 V. An example of the change of the extinction ratio defined as the ratio of light intensity I(V)/I(0) provided that light intensity transmitted through the optical fiber is designated as I(V), is shown as ○ in FIG. 11. In FIG. 11, the extinction ratio becomes larger as the value on the ordinate axis is smaller (as the position is lower). Further, as a Comparative Example, a change of the extinction ratio in a case of a complex type liquid crystal element without having the phase plate 220 is shown by □.

The extinction ratio was at most −12 dB in the case of the liquid crystal element without employing the phase plate. However, in the case of the construction of this Example employing the phase plate, a high extinction ratio of −40 dB was obtained.

Example 3

The liquid crystal element of the present invention will be described employing FIG. 14. A nematic liquid crystal having an ordinary refractive index of $n_0$ (lc)=1.50 and an extraordinary refractive index of $n_e$ (lc)=1.66 was employed to form a liquid crystal layer 1 having a thickness d (lc) of 4.5 µm. Alignment layers formed on the substrates were subjected to an aligning treatment so that the fast axis direction of the liquid crystal cell constituting the liquid crystal element became 135° with respect to X-axis in FIG. 14.

Further, both of the liquid crystal polymer layers 31 and 32 as phase plates were formed to have an ordinary refractive index of $n_0$=1.55 and an extraordinary refractive index of $n_e$=1.65. The thicknesses of the liquid crystal polymer layers were 7.7 µm and 3.85 µm respectively so that their retardation values for the central wavelength 1550 nm of the wavelength band from 1400 nm to 1700 nm, became λ/2 and λ/4 respectively. Here, the liquid crystal polymer layers 31 and 32 were bonded so that their fast axis directions are at 30° and −30° respectively with respect to X-axis as the polarization direction of incident light, namely, so that their fast axis directions were at an angle of 60° to each other by employing an adhesive 33 made of a homogeneous refractive index transparent material.

The phase plate 230 comprising a lamination of the liquid crystal polymer layers 31 and 32 thus obtained, is a phase plate having a retardation value of substantially λ/4 for the incident light, and its fast axis direction and the fast axis direction of the liquid crystal cell forms an angle of 45°.

On the liquid crystal element, a linearly polarized light having a wavelength of from 1400 nm to 1700 nm and polarized in X-axis direction, is incident. When the voltage was not applied, the retardation value of the liquid crystal cell 210 was 0.72 µm and the output light from the liquid crystal element 400 became a linearly polarized light polarized in a direction about 150° rotated from the polarization direction of the incident light (the angle between both directions is about 30°). Further, the retardation value of the liquid crystal cell 210 was at most 0.05 µm when a rectangular wave AC voltage having a voltage amplitude of at least 10 V was applied, and the output light from the liquid crystal element 400 became a linearly polarized light polarized in a direction about 60° rotated from the polarization direction of the incident light.

Here, the ellipticity (a ratio a/b of the minor axis amplitude (a) to the major axis amplitude (b) of the output elliptically polarized light) showing the linearity of the output linearly polarized light, showed a high linearity of at most 0.01 in a wavelength band of from 1400 nm to 1700 nm, and a polarization rotator was obtained, which can rotate the polarization direction of the output light from 150° to 60° in accordance with the applied voltage of from 0 to 10 V.

INDUSTRIAL APPLICABILITY

As described above, the multi-layer diffraction type polarizer of the present invention has a high extinction ratio for incident light having a wide wavelength band. By employing the multi-layer diffraction type polarizer of the present invention, a high performance isolator can be obtained.

Further, by employing a liquid crystal element of the present invention, the output light intensity is gradually decreased as the applied voltage is increased, whereby a voltage variable type optical attenuator having a high extinction ratio even at a low voltage of about 5V can be realized.

Further, by turning on/off the applied voltage, a switching element having a high extinction ratio can be obtained.

Further, by forming a complex type liquid crystal element of the present invention comprising the multi-layer diffraction type polarizer and the liquid crystal element integrally formed, temperature rise of the liquid crystal layer is small even if high intensity light is incident since the element absorbs little light. As a result, an optical attenuator providing a stable extinction ratio can be realized.

Further, by employing the liquid crystal element of the present invention, the state of linear polarization is maintained regardless of the variation of the incident angle and the wavelength of linearly polarized incident light on the liquid crystal element, whereby a polarization rotator is obtained which can rotate the polarization direction in accordance with the magnitude of the voltage applied to the liquid crystal cell constituting the liquid crystal element.

What is claimed is:

1. A multi-layer diffraction type polarizer comprising:
a lamination of at least two polarizing diffraction gratings each comprising a birefringent material,
wherein
the polarizing diffraction gratings each straightly transmits incident light having a first polarization direction without functioning as a diffraction grating, and diffracts incident light having a second polarization direction perpendicular to the first polarization direction by functioning as a diffraction grating, and
each of the polarizing diffraction gratings comprises a birefringent material layer formed on a transparent substrate and having an ordinary refractive index of $n_0$ and an extraordinary refractive index of $n_e$, ($n_0 \neq n_e$), the birefringent material layer being processed to have a periodical concavo-convex shape having a step height of d in cross section, a homogeneous refractive index transparent material having a refractive index equal to $n_0$ or $n_e$ is filled in at least the concave portions, and the retardation value $|n_e - n_0| \times d$ is (m+0.45 to 0.55) times (m is zero or a positive integer) the wavelength $\lambda$ of the incident light.

2. The multi-layer diffraction type polarizer according to claim 1, wherein the step heights d of the polarizing diffraction gratings are different from each other.

3. A method of diffracting polarized light comprising:
transmitting light through a lamination of at least two polarizing diffraction gratings each comprising a birefringent material,
wherein
the polarizing diffraction gratings each straightly transmits incident light having a first polarization direction without functioning as a diffraction grating, and diffracts incident light having a second polarization direction perpendicular to the first polarization direction by functioning as a diffraction grating, and
each of the polarizing diffraction gratings comprises a birefringent material layer formed on a transparent substrate and having an ordinary refractive index of $n_0$ and an extraordinary refractive index of $n_e$, ($n_0 \neq n_e$), the birefringent material layer being processed to have a periodical concavo-convex shape having a step height of d in cross section, a homogeneous refractive index transparent material having a refractive index equal to $n_0$ or $n_e$ is filled in at least the concave portions, and the retardation value $|n_e - n_0| \times d$ is (m+0.45 to 0.55) times (m is zero or a positive integer) the wavelength $\lambda$ of the incident light.

4. A multi-layer diffraction type polarizer comprising:
a lamination of at least two polarizing diffraction gratings each comprising a birefringent material,
wherein
the polarizing diffraction gratings each straightly transmits incident light having a first polarization direction without functioning as a diffraction grating, and diffracts incident light having a second polarization direction perpendicular to the first polarization direction by functioning as a diffraction grating, and
each of the polarizing diffraction gratings comprises a birefringent material layer formed on a transparent substrate and having an ordinary refractive index of $n_0$ and an extraordinary refractive index of $n_e$, ($n_0 \neq n_e$), the birefringent material layer being processed to have a periodical concavo-convex shape having in cross section a step height of $d_1$ or $d_2$ that is unique to each polarizing diffraction grating, a homogeneous refractive index transparent material having a refractive index equal to $n_0$ or $n_e$ is filled in at least the concave portions, and
provided that the wavelength of incident light is present within a range from $\lambda_1$ to $\lambda_2$ and that $|n_0 - n_e|$ is designated as $\Delta n$, $d_1$ and $d_2$ are present between $\lambda_1/(2 \times \Delta n)$ and $\lambda_2/(2 \times \Delta n)$.

5. The multi-layer diffraction type polarizer according to claim 4, wherein the refractive index of the homogenous refractive index transparent material is equal to the ordinary refractive index $n_0$ of the birefringent material layer.

6. A method of diffracting polarized light comprising:
transmitting light through a lamination of two polarizing diffraction gratings each comprising a birefringent material,
wherein
the polarizing diffraction gratings each straightly transmits incident light having a first polarization direction without functioning as a diffraction grating, and diffracts incident light having a second polarization direction perpendicular to the first polarization direction by functioning as a diffraction grating, and
each of the polarizing diffraction gratings comprises a birefringent material layer formed on a transparent substrate and having an ordinary refractive index of $n_0$ and an extraordinary refractive index of $n_e$, ($n_0 \neq n_e$), the birefringent material layer being processed to have a periodical concavo-convex shape in cross section having a step height of $d_1$ or $d_2$ that is unique to each polarizing diffraction grating, a homogeneous refractive index transparent material having a refractive index equal to $n_0$ or $n_e$ is filled in at least the concave portions, and
provided that the wavelength of incident light is present within a range from $\lambda_1$ to $\lambda_2$ and that $|n_0 - n_e|$ is designated as $\Delta n$, $d_1$ and $d_2$ are present between $\lambda_1/(2 \times \Delta n)$ and $\lambda_2/(2 \times \Delta n)$.

7. The multi-layer diffraction type polarizer according to claim 6, wherein the refractive index of the homogenous refractive index transparent material is equal to the ordinary refractive index $n_0$ of the birefringent material layer.

* * * * *